US012804641B2

(12) United States Patent
Yuan et al.

(10) Patent No.: US 12,804,641 B2
(45) Date of Patent: Nov. 17, 2026

(54) EXTENDING UPLINK COMMUNICATIONS BY USER EQUIPMENT COOPERATION

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 18/259,062

(22) PCT Filed: Feb. 10, 2021

(86) PCT No.: PCT/CN2021/076555
§ 371 (c)(1),
(2) Date: Jun. 22, 2023

(87) PCT Pub. No.: WO2022/170571
PCT Pub. Date: Aug. 18, 2022

(65) Prior Publication Data
US 2024/0073889 A1 Feb. 29, 2024

(51) Int. Cl.
*H04W 72/1268* (2023.01)
*H04W 88/04* (2009.01)

(52) U.S. Cl.
CPC ........ *H04W 72/1268* (2013.01); *H04W 88/04* (2013.01)

(58) Field of Classification Search
None
See application file for complete search history.

(56) References Cited

U.S. PATENT DOCUMENTS 9,031,590 B2 * 5/2015 Park ...................... H04W 76/14 455/500
2013/0301570 A1 * 11/2013 Xu .................... H04W 72/1268 370/329
(Continued)

FOREIGN PATENT DOCUMENTS

CN 104244392 A 12/2014
CN 105122932 A 12/2015
WO WO-2019156505 A1 * 8/2019 ........ H04W 73/0453

OTHER PUBLICATIONS

International Search Report and Written Opinion—PCT/CN2021/076555—ISA/EPO—Aug. 16, 2021.

*Primary Examiner* — Jae Y Lee
*Assistant Examiner* — Nam P. Cao
(74) *Attorney, Agent, or Firm* — Arent Fox LLP/Qualcomm

(57) ABSTRACT

Apparatus, methods, and computer-readable media for extending uplink communications by user equipment (UE) cooperation are disclosed herein. A target UE may receive, from a base station (BS), a target UE uplink configuration for a scheduled uplink transmission. The target UE may determine that the target UE uplink configuration includes an indication that a cooperative UE is configured to transmit the scheduled uplink transmission for the target UE based on a cooperative UE uplink configuration of the cooperative UE. The target UE may transmit, to the cooperative UE, information for transmitting the scheduled uplink transmission. The BS transmits, to the target UE, the target UE uplink configuration indicating the cooperative UE uplink configuration. The BS transmits, to the cooperative UE, the cooperative UE uplink configuration indicating an uplink resource allocation for transmitting the scheduled uplink transmission for the target UE. The BS receives, from the cooperative UE, the scheduled uplink transmission.

28 Claims, 12 Drawing Sheets

(56) References Cited

U.S. PATENT DOCUMENTS

| | | | | |
|---|---|---|---|---|
| 2017/0181150 | A1 | 6/2017 | Lee et al. | |
| 2020/0036414 | A1* | 1/2020 | Shattil | H04B 1/0003 |
| 2021/0037503 | A1 | 2/2021 | Nam et al. | |
| 2021/0377108 | A1* | 12/2021 | Cho | H04L 41/0803 |

* cited by examiner

EXTENDING UPLINK COMMUNICATIONS BY USER EQUIPMENT COOPERATION

CROSS REFERENCE TO RELATED APPLICATION(S)

This application is a National Phase entry of PCT Application No. PCT/CN2021/076555, entitled "EXTENDING UPLINK COMMUNICATIONS BY USER EQUIPMENT COOPERATION" and filed on Feb. 10, 2021, which is expressly incorporated by reference herein in its entirety.

BACKGROUND

Technical Field

The present disclosure relates generally to wireless communication systems, and more particularly, to extending uplink communications by user equipment cooperation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as based on sidelink. There exists a need for further improvements in wireless communication technology.

These improvements may also be applicable to other multi-access technologies and the telecommunication standards that employ these technologies. For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For NR, multiple-transmission and reception points (M-TRP) scheduling with single downlink control information (DCI) can be provided using multiple localized panels in a user equipment (UE) in order to communicate with a base station over a Uu direct link. In the M-TRP scheduling, the same timeline can applied to different panels with a scheduling parameter, such as k1. In some implementations, multiple UEs may cooperate together in order to communicate with the base station over respective Uu direct links. In UE cooperation, the panels may be distributed across the multiple UEs. For example, in a UE cooperation network of three UEs, each UE may include one panel of a total of three distributed panels. The three panels can cooperate with one another to form a virtual 3-panel UE that can communicate with the base station over the respective Uu direct links.

However, unlike downlink transmissions, uplink transmissions at a low-power user equipment are limited. For example, uplink transmissions at a UE (or panel) is typically power-limited and consumes a significant amount of power. In contrast to uplink transmissions, a downlink transmission at a base station is stronger as it can utilize significantly more power, thus providing greater downlink coverage. But for uplink transmissions, because the UE has a relatively smaller uplink transmission power compared to the base station, the uplink transmission coverage for UE can be significantly limited. In other cases, downlink and uplink capabilities may be different. For example, in carrier aggregation, a low-power UE may need to support four carrier components operating with 100 MHz bandwidth in each carrier for downlink transmissions, but may only have capability to support two carrier components operating with 100 MHz bandwidth in each carrier for uplink transmissions. In this regard, the uplink transmissions may be more bottlenecked by UE capability limitations, transmission power limitations, thereby resulting in significant performance and coverage gaps compared to downlink reception.

The present disclosure describes various techniques and solutions for improving uplink communications by extending uplink communications by UE cooperation. The UE cooperation may include a cooperation between a UE of a lower transmit power and a cooperative UE of a higher transmit power that can assist the UE (or panels) in uplink transmissions. The cooperative UE may be a form of a powerful UE and may provide more advantageous UE capability over a standard UE. For example, if the UE is a power class 3 (e.g., at 23 dB) and the cooperative UE has a power class 2 (e.g., at 26 dB), the cooperative UE has a higher transmit power than the UE. In this case, the cooperative UE can assist the UE with an uplink transmission by increasing the uplink transmit power and increasing the uplink coverage for the UE. Typically, the cooperative UE is not a wearable device, and thus is less likely to suffer from any regulatory issues, such as maximum permissible exposure (MPE) and/or specific absorption rate (SAR) restrictions.

In another aspect of the disclosure, a method, a computer-readable medium, and an apparatus are provided. In some aspects, the apparatus is a target user equipment. The apparatus can receive, from a base station, a target UE uplink configuration for a scheduled uplink transmission. The apparatus can determine that the target UE uplink configuration includes an indication that a cooperative UE is configured to transmit the scheduled uplink transmission for the target UE based on a cooperative UE uplink configuration of the cooperative UE. The apparatus can transmit, to the cooperative UE, information for transmitting the scheduled uplink transmission.

In another aspect of the disclosure, a method, a computer-readable medium, and an apparatus are provided. In some aspects, the apparatus is a cooperative UE (e.g., a customer premises equipment). The apparatus can receive, from a base station, a cooperative UE uplink configuration indicating an uplink resource allocation for transmitting a scheduled uplink transmission for a target UE. The apparatus can receive, from the target UE, information for transmitting the scheduled uplink transmission. The apparatus can transmit, to the base station, the scheduled uplink transmission for the target UE.

In an aspect of the disclosure, a method, a computer-readable medium, and an apparatus are provided. In some aspects, the apparatus is a base station. The apparatus can transmit, to a target user equipment, a target UE uplink configuration indicating a cooperative UE uplink configuration associated with a cooperative UE. The apparatus can transmit, to a cooperative UE, the cooperative UE uplink configuration indicating an uplink resource allocation for transmitting a scheduled uplink transmission for the first UE. The apparatus can receive, from the cooperative UE, the scheduled uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
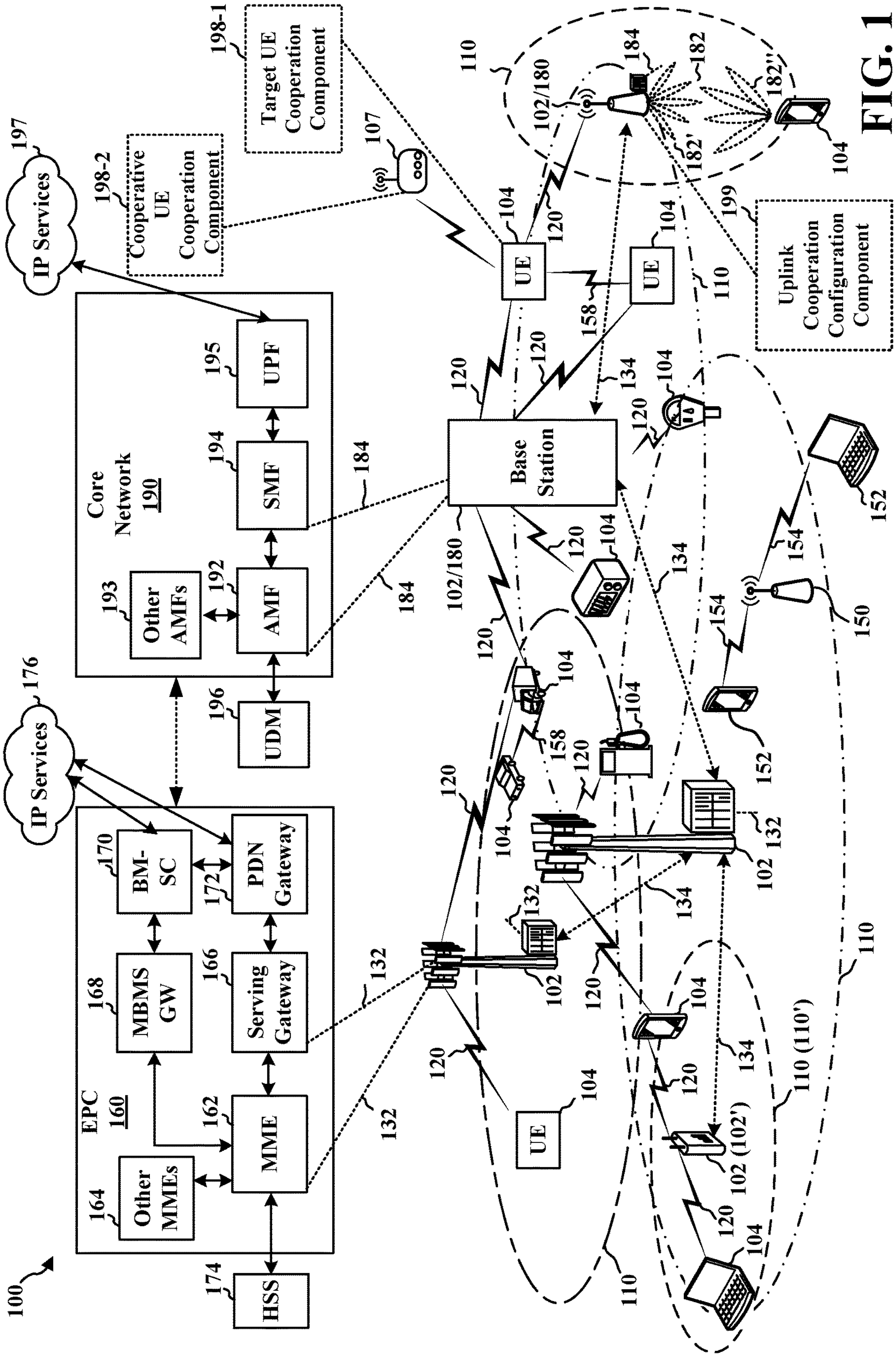
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some wireless communication may be exchanged directly between wireless devices based on sidelink. The communication may be based on vehicle-to-anything (V2X) or other device-to-device (D2D) communication, such as Proximity Services (ProSe), etc. Sidelink communication may be exchanged based on a PC5 interface, for example.

In sidelink communication, control information may be indicated by a transmitting UE in multiple SCI parts. The SCI may indicate resources that the UE intends to use, for example, for a sidelink transmission. The UE may transmit a first part of control information indicating information about resource reservation in a physical sidelink control channel (PSCCH) region, and may transmit a second part of the control information in a PSSCH region. For example, a first stage control (e.g., SCI-1) may be transmitted on a PSCCH and may contain information for resource allocation and information related to the decoding of a second stage control (e.g., SCI-2). The second stage control (SCI-2) may be transmitted on a PSSCH and may contain information for decoding data (SCH). Therefore, control information may be indicated through a combination of the first SCI part included in the PSCCH region (e.g., the SCI-1) and the second SCI part included in the PSSCH region (e.g., the SCI-2). In other aspects, control information may be indicated in a media access control (MAC) control element (MAC-CE) portion of the PSSCH.

Some examples of sidelink communication may include vehicle-based communication such as vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as V2X communications. As an example, in FIG. 1, a UE 104, e.g., a transmitting Vehicle User Equipment (VUE) or other UE 104, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as a RSU, etc. Aspects of the communication may be based on PC5 or sidelink communication e.g., as described in connection with the example in FIG. 3. Although the following description may provide examples for V2X/D2D communication in connection with 5G NR, the concepts described herein may be applicable to other similar areas, such as LTE, LTE-A, CDMA, GSM, and other wireless technologies.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or a customer premises equipment (CPE) 107 to communicate with another UE 104 or CPE 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The CPE 107 may be a terminal and/or associated equipment located at a subscriber's premises and connected with a carrier's telecommunication circuit at the demarcation point. Examples of CPE 107 include a terminal, modem, adapter, set-top box, router, telephone, network switch, residential gateway, Internet access gateway, fixed mobile convergence device, or any other similar functioning device.

Further, although the present disclosure may focus on vehicle-to-pedestrian (V2P) communication and pedestrian-to-vehicle (P2V) communication, the concepts and various aspects described herein may be applicable to other similar areas, such as D2D communication, IoT communication, vehicle-to-everything (V2X) communication, or other standards/protocols for communication in wireless/access networks.

Referring again to FIG. 1, in certain aspects, the UE 104 may include a target UE cooperation component 198-1 that is configured to receive, from a base station, a target UE uplink configuration for a scheduled uplink transmission. The target UE cooperation component 198-1 can determine that the target UE uplink configuration includes an indication that a cooperative UE is configured to transmit the scheduled uplink transmission for the first UE based on a cooperative UE uplink configuration of the cooperative UE. The target UE cooperation component 198-1 can transmit, to the cooperative UE, information for transmitting the scheduled uplink transmission.

Furthermore, in certain aspects, the base station 102/180 may include an uplink cooperation configuration component 199 that is configured to transmit, to a first user equipment, a target UE uplink configuration indicating a cooperative UE uplink configuration associated with a cooperative UE. The uplink cooperation configuration component 199 can transmit, to a cooperative UE, the cooperative UE uplink configuration indicating an uplink resource allocation for transmitting a scheduled uplink transmission for the first UE. The uplink cooperation configuration component 199 can receive, from the cooperative UE, the scheduled uplink transmission.

Furthermore, in certain aspects, the CPE 107 may include a cooperative UE cooperation component 198-2 that is configured to receive, from a base station, a cooperative UE uplink configuration indicating an uplink resource allocation for transmitting a scheduled uplink transmission for a target UE. The cooperative UE cooperation component 198-2 can receive, from the target UE, information for transmitting the scheduled uplink transmission. The cooperative UE cooperation component 198-2 can transmit, to the base station, the scheduled uplink transmission for the target UE. Further related aspects and features are described in more detail in connection with FIGS. 5-12. Although the following description may be focused on 5G NR, the concepts described herein may be applicable to other similar areas, such as LTE, LTE-A, CDMA, GSM, and other wireless technologies.

Figures 2A, 2B, 2C, 2D:
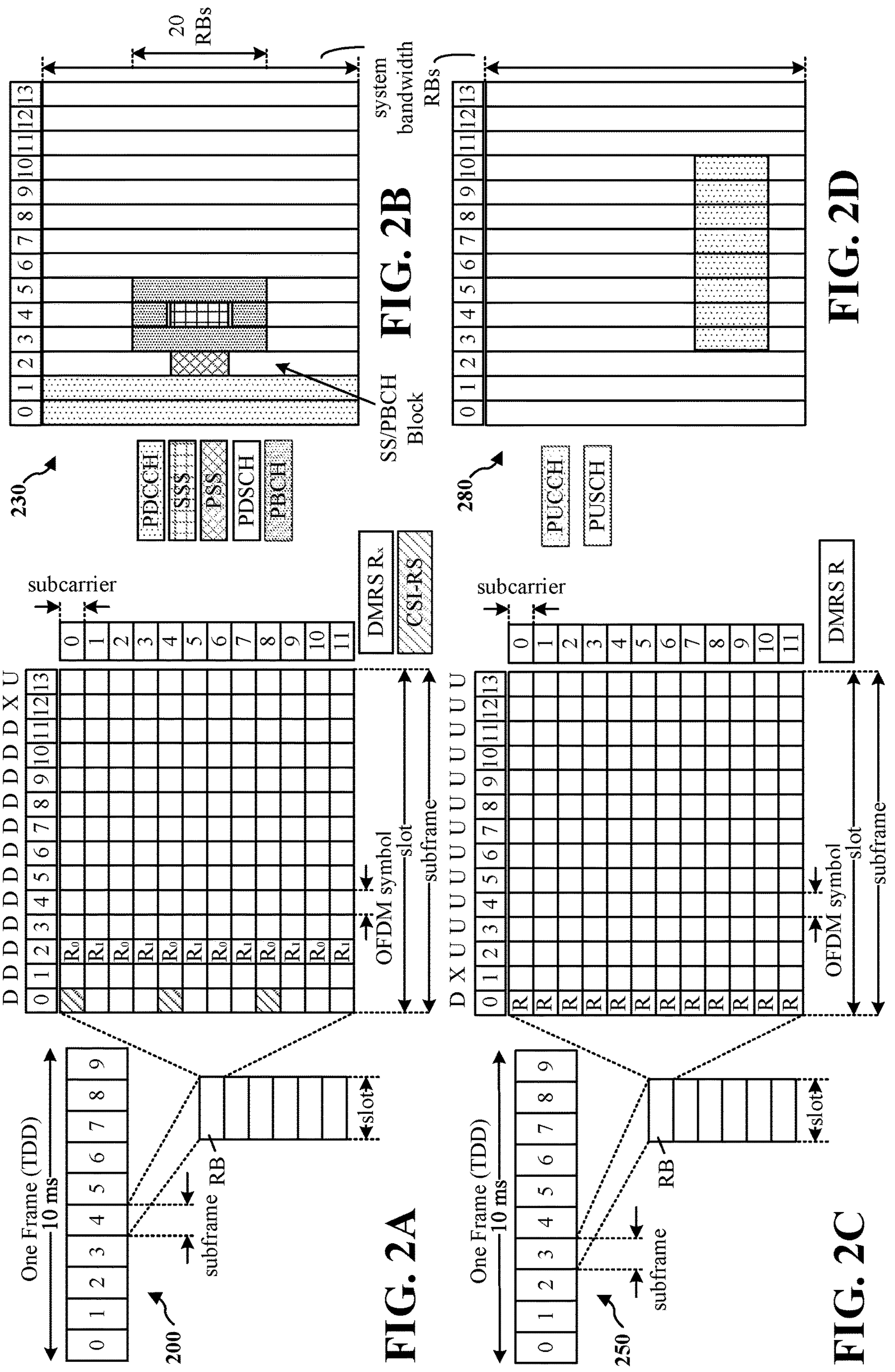
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency domain duplexed (FDD) in which for a particular set of subcarriers (carrier system bandwidth), subframes within the set of subcarriers are dedicated for either DL or UL, or may be time domain duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies p 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. In some aspects, the DCI carries downlink feedback information (DFI). The DFI may be used for handling the hybrid automatic repeat request-acknowledgment (HARQ-ACK) protocol in conjunction with a CG transmission in the uplink. The DFI may be transmitted using the PDCCH scrambled with CS-RNTI, such that no new physical channel is defined. Rather, the DCI format 0_1 frame structure is reused with a DFI flag indicating whether the remainder of the DCI is to be interpreted as an uplink scheduling grant or downlink feedback information. To distinguish usage of the DCI for activation/deactivation CG transmission and DFI, a 1 bit flag (serving as an explicit indication) is used, when type 1 and/or type 2 CG PUSCH is configured. If the DFI flag is set, the remainder of the DCI is interpreted as a bitmap to indicate positive acknowledgment (ACK) or negative acknowledgment (NACK) for each HARQ process contained within the DFI. The DFI size may be aligned with the UL grant DCI format 0_1 size. For example, reserved bits may be included to ensure the overall size of the DFI is equivalent to the DCI format 0_1 frame structure size regardless whether the DCI format 0_1 frame structure size carries an uplink grant or downlink feedback information, thus, the number of blind decoding attempts is not increased. In this regard, the UE blind decoding complexity is not increased due to matching sizes. In some aspects, the content of DFI includes: (1) a 1 bit UL/downlink (DL) flag, (2) a 0- or 3-bit carrier indicator field (CIF), 3 bits are used in the case of a cross carrier scheduled is configured, (3) the 1-bit DFI flag, used to distinguish between DCI format 0_1 based activation/deactivation and DFI, (4) 16-bit HARQ-ACK bitmap, (5) 2-bit transmit power control (TPC) command, and (6) any zero-padding to match the length of the DCI format 0_1 frame structure.

A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
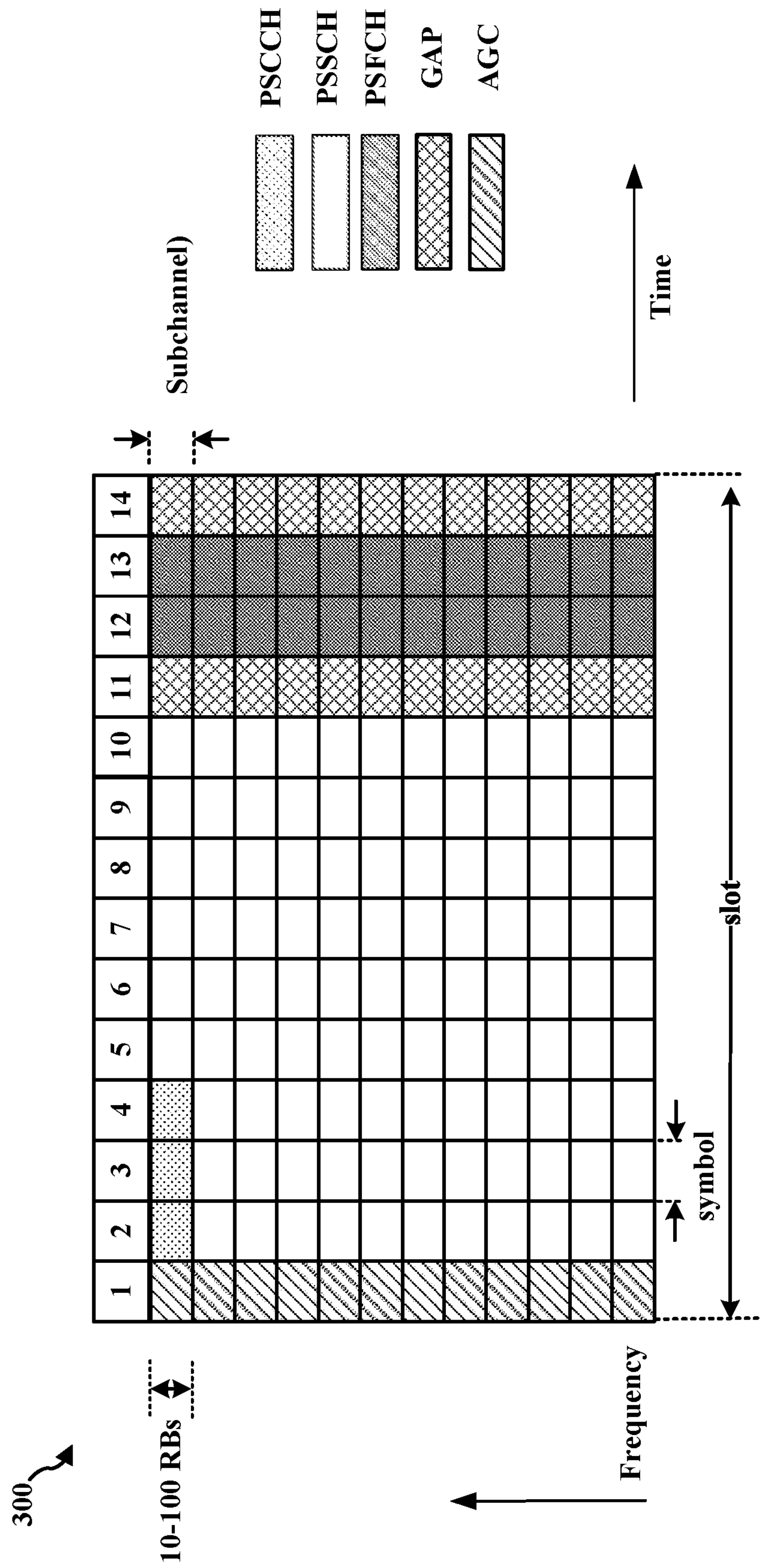
FIG. 3 illustrates example aspects of a sidelink slot structure.

FIG. 3 illustrates example diagram 300 illustrating non-limiting examples of time and frequency resources that may be used for wireless communication based on sidelink. In some examples, the time and frequency resources may be based on a slot structure. In other examples, a different structure may be used. The slot structure may be within a 5G/NR frame structure in some examples. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI).

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Diagram 300 also illustrates multiple subchannels, where each subchannel may include multiple RBs. For example, one subchannel in sidelink communication may include 10-100 RBs. As illustrated in FIG. 3, the first symbol of a subframe may be a symbol for automatic gain control (AGC). Some of the REs may include control information, e.g., along with PSCCH and/or PSSCH. The control information may include Sidelink Control Information (SCI). For example, the PSCCH can include a first-stage SCI. A PSCCH resource may start at a first symbol of a slot, and may occupy 1, 2 or 3 symbols. The PSCCH may occupy up to one subchannel with the lowest subcarrier index. FIG. 3 also illustrates symbol(s) that may include PSSCH. The symbols in FIG. 3 that are indicated for PSCCH or PSSCH indicate that the symbols include PSCCH or PSSCH REs. Such symbols corresponding to PSSCH may also include REs that include a second-stage SCI and/or data. At least one symbol may be used for feedback (e.g., PSFCH), as described herein. As illustrated in FIG. 3, symbols 12 and 13 are indicated for PSFCH, which indicates that these symbols include PSFCH REs. In some aspects, symbol 12 of the PSFCH may be a duplication of symbol 13. A gap symbol prior to and/or after the feedback may be used for turnaround between reception of data and transmission of the feedback. As illustrated in FIG. 3, symbol 10 includes a gap symbol to enable turnaround for feedback in symbol 11. Another symbol, e.g., at the end of the slot (symbol 14) may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the PSCCH, PSSCH, PSFCH, and gap symbols may be different than the example illustrated in FIG. 3.

Figure 4:
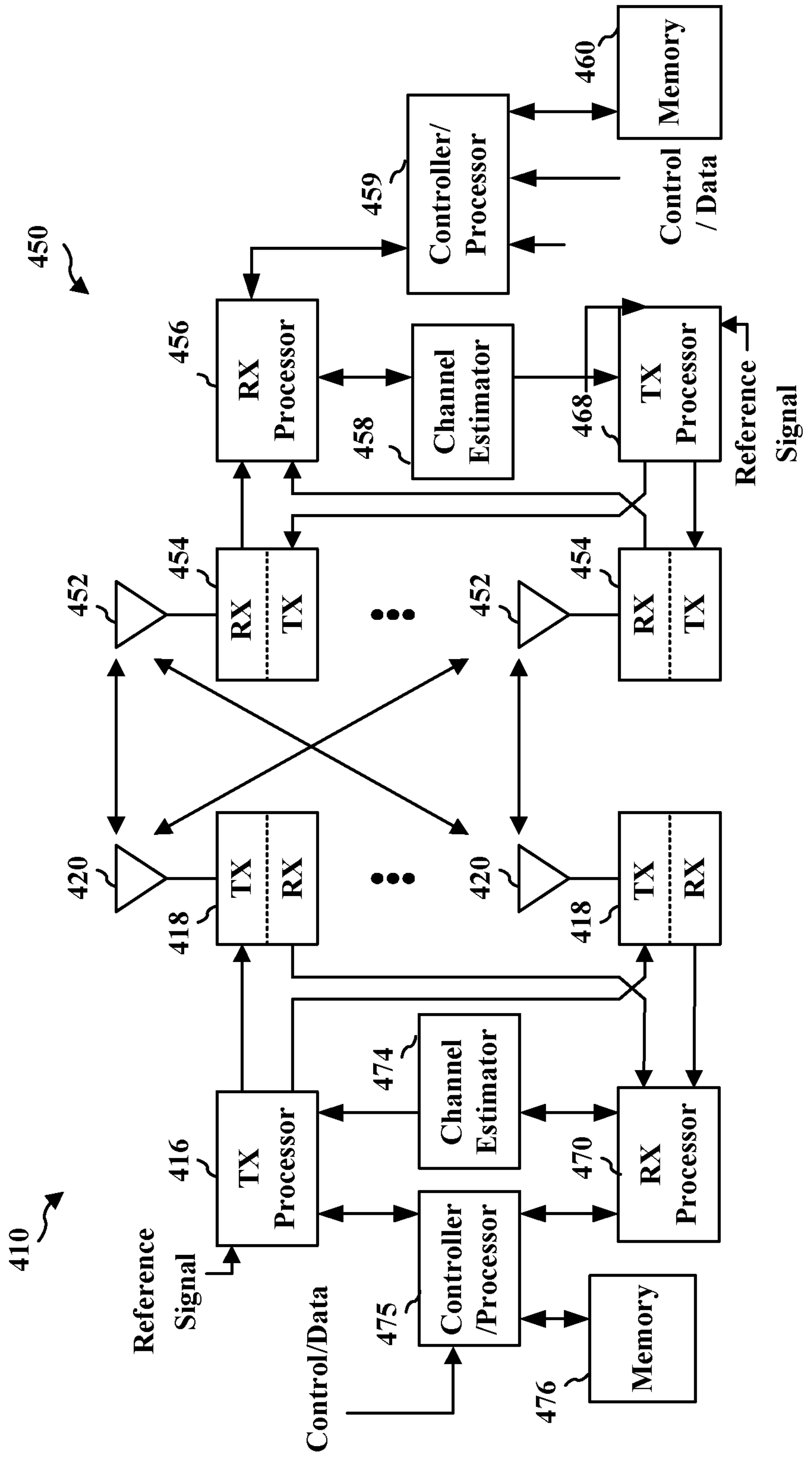
FIG. 4 is a block diagram of a first wireless communication device in communication with a second wireless communication device.

FIG. 4 is a block diagram of a first wireless communication device 410 in communication with a second wireless communication device 450. The communication may be based on sidelink, e.g., using a PC5 interface. In some examples, the devices 410 and 450 may communicate based on Uu interface. The devices 410 and the 450 may include a UE, a CPE, an RSU, a base station, etc. In some examples, the device 410 may be a base station and the device 450 may be a UE. Packets may be provided to a controller/processor 475 that implements layer 4 and layer 2 functionality. Layer 4 includes a radio resource control (RRC) layer, and layer 2 includes a packet data convergence protocol (PDCP) layer, a radio link control (RLC) layer, and a medium access control (MAC) layer.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418TX. Each transmitter 418TX may modulate an radio frequency (RF) carrier with a respective spatial stream for transmission.

At the device 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 410. These soft decisions may be based on channel estimates computed by the channel estimator 458. The soft decisions are then decoded and deinterleaved to recover the data and control signals that were originally transmitted by device 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. The controller/processor 459 may provide demultiplexing between transport and logical channels, packet reassembly, deciphering, header decompression, and control signal processing. The controller/processor 459 is also responsible for error detection using an ACK and/or NACK protocol to support HARQ operations.

Similar to the functionality described in connection with the transmission by device 410, the controller/processor 459 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The transmission is processed at the device 410 in a manner similar to that described in connection with the receiver function at the device 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing. The controller/processor 475 is also responsible for error detection using an ACK and/or NACK protocol to support HARQ operations.

At least one of the TX processor 468, the RX processor 456, or the controller/processor 459 of device 450 or the TX 416, the RX processor 470, or the controller/processor 475 may be configured to perform aspects described in connection with the target UE cooperation component 198-1, cooperative UE cooperation component 198-2 and/or the uplink cooperation configuration component 199 of FIG. 1.

Figure 5:
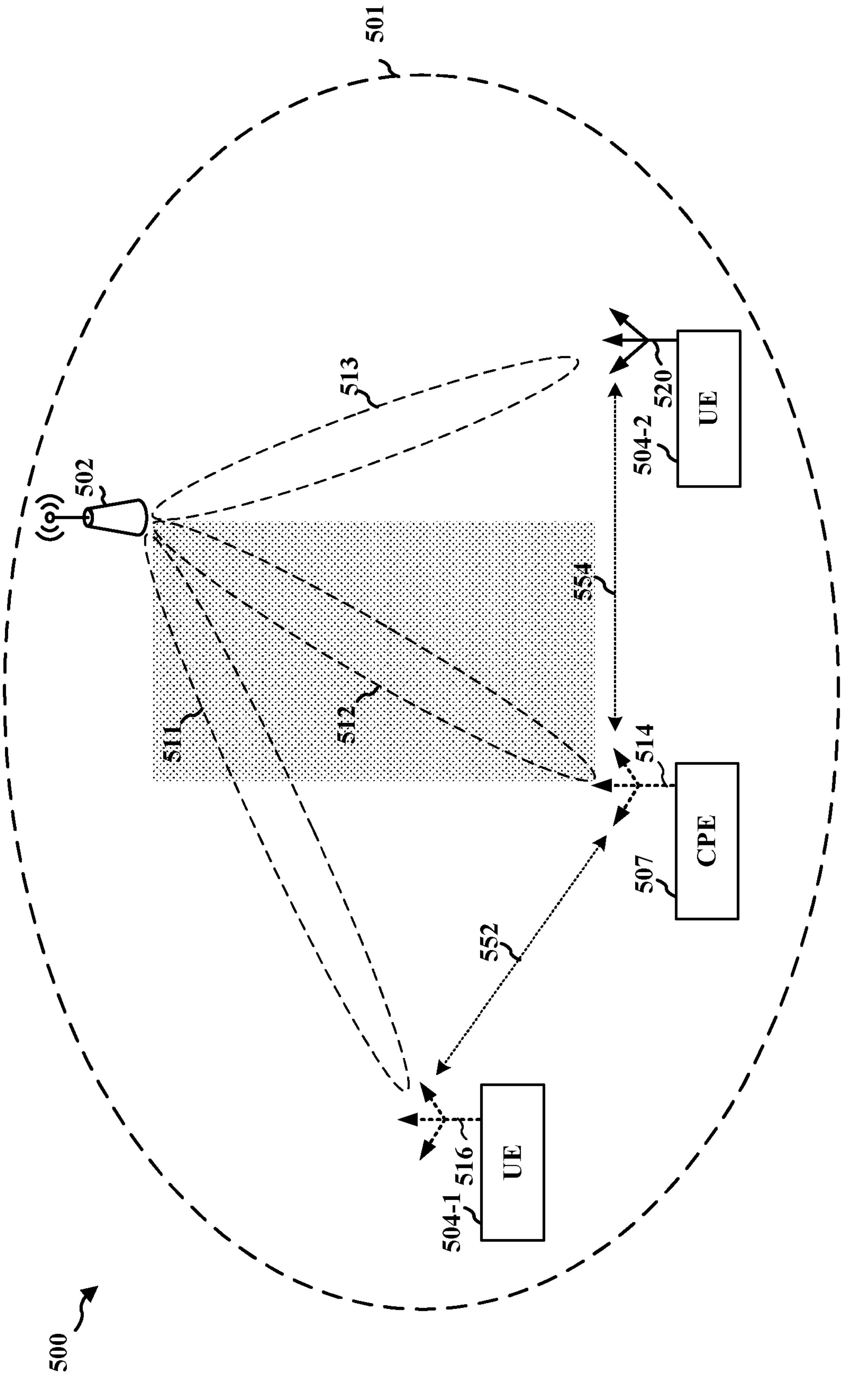
FIG. 5 illustrates an example of extending uplink by UE cooperation, in accordance with one or more of aspects of the present disclosure.

FIG. 5 illustrates an example of extending uplink communications by UE cooperation with direct link communication and sidelink communication between wireless devices in a network environment 500. The communication may be based on a slot structure comprising aspects described in connection with FIGS. 2A-2D, 3 or another slot structure. The example 500 illustrates UEs 504-1, 504-2, CPE 507, and base station 502. Although the example in FIG. 5 is described for the UEs 504-1, 504-2, aspects may be applied to other wireless devices configured for communication based on Uu direct link and/or sidelink, such as an RSU, an integrated access and backhaul (IAB) node, etc. The UEs 504-1, 504-2 may each be capable of operating as a transmitting device in addition to operating as a receiving device. Thus, the UEs 504-1, 504-2 are illustrated as respectively transmitting transmissions 516 and 520. The transmissions 516 or 520 may be broadcast or multicast to nearby devices. For example, the UE 504-1 may transmit communication intended for receipt by other UEs within a range of the UE 504-1. In other examples, the transmissions 516, or 520 may be groupcast to nearby devices that a member of a group. In other examples, the transmissions 516 or 520 may be unicast from one UE to another UE. Additionally or alternatively, the CPE 507 may receive communication from and/or transmit communication 514 to the UEs 504-1, 504-2.

The UEs 504-1, 504-2 may include a target UE cooperation component, similar to the target UE cooperation component 198-1 described in connection with FIG. 1. The CPE 507 may additionally or alternatively include a cooperative UE cooperation component, similar to the cooperative UE cooperation component 198-2 described in connection with FIG. 1. The base station 502 may additionally or alternatively include an uplink cooperation configuration component, similar to the uplink cooperation configuration component 199 described in connection with FIG. 1.

As shown in FIG. 5, a first target UE (e.g., UE 504-1) and a cooperative UE (e.g., CPE 507) may communicate with one another via a sidelink channel (e.g., 552). Similarly, a second target UE (e.g., UE 504-2) and the cooperative UE (e.g., CPE 507) may communicate with one another via a sidelink channel (e.g., 554). In a dual connectivity mode, a base station (e.g., 502) may communicate with the first target UE 504-1 via a first access link (e.g., 511). Additionally, or alternatively, the base station 502 may communicate with the second target UE 504-2 via a second access link (e.g., 513). Additionally, the base station 502 may communicate with the CPE 507 via a third access link (e.g., 512). The first target UE 504-1 and/or the second target UE 504-2 may correspond to one or more UEs described elsewhere herein, such as the UE 104 of FIG. 1. Thus, a direct link connection between UEs 504-1, 504-2 and the CPE 507 (e.g., via a PC5 interface) may be referred to as a sidelink, a direct link connection between the base station 502 and the UEs 504-1, 504-2, CPE 507 (e.g., via Uu interface) may be referred to as an access link. Sidelink communications may be transmitted via the sidelink, and access link communications may be transmitted via the access link. An access link communication may be either a downlink communication (from a base station 102/180 to a UE 104) or an uplink communication (from a UE 104 to a base station 102/180).

As described above, uplink transmissions at a low-power user equipment (e.g., UEs 504-1, 504-2) may be limited. For example, uplink transmissions at a UE (or panel) is typically power-limited and consumes a significant amount of power. In contrast to uplink transmissions, a downlink transmission at the base station 502 is stronger as it can utilize significantly more power, thus providing greater downlink coverage. But for uplink transmissions, because the UE has a relatively smaller uplink transmission power compared to the base station 502, the uplink transmission coverage for UE can be significantly limited. In other cases, downlink and uplink capabilities may be different. For example, in carrier aggregation, a low-power UE may need to support four carrier components operating with 100 MHz bandwidth in each carrier for downlink transmissions, but may only have capability to support two carrier components operating with 100 MHz bandwidth in each carrier for uplink transmissions. In this regard, the uplink transmissions may be more bottlenecked by UE capability limitations, transmission power limitations, thereby resulting in significant performance and coverage gaps compared to downlink reception.

The subject technology provides for a cooperation between a UE of a lower transmit power (e.g., 504-1, 504-2) and a cooperative UE of a higher transmit power (e.g., CPE 507) that can assist the UE (or panels) in uplink transmissions. The cooperative UE may be a form of a powerful UE and may provide more advantageous UE capability over a standard UE. For example, if the UE is a power class 3 (e.g., at 23 dB) and the cooperative UE has a power class 2 (e.g., at 26 dB), the cooperative UE has a higher transmit power than the UE. In this case, the cooperative UE can assist the UE with an uplink transmission by increasing the uplink transmit power and increasing the uplink coverage for the UE. In some cases, UE1 (e.g., 504-1) and UE2 (e.g., 504-2) may not be configured for UL transmissions. For example, UE1 and UE2 may each be configured for downlink transmission but neither is configured for an uplink transmission, so the uplink transmission can be performed by the cooperative UE (e.g., CPE 507).

In the network environment 500, it may be assumed that the base station 502 and the UEs 504-1, 504-2 know in advance that the CPE 507 may transmit uplink communications for the first target UE 504-1 and/or the second target UE 504-2. In one or more implementations, to extend uplink communications by UE cooperation, a target UE (or panel of the target UE) can be shared with uplink configurations of a cooperative UE. When the target UE (or panel of the UE) is indicated with uplink configurations of a cooperative UE, the cooperative UE can transmit a scheduled uplink transmission for the target UE.

In some aspects, the target UE can receive two configurations: (1) a first downlink configuration ("DL1") from the base station 502, and (2) a first uplink configuration ("UL1") from the base station 502. Similarly, the CPE 507 receives two configurations: (1) a second downlink configuration ("DL2") from the base station 502 and a second uplink configuration ("UL2") from the base station 502. In some aspects, the CPE 507 may shares its uplink configuration (e.g., UL2) with a target UE (e.g., first target UE 504-1, second target UE 504-2). This may be referred to as a shared uplink configuration between the target UE and the cooperative UE. The downlink configurations DL1 or DL2 may be a PDCCH configuration including a control resource set configuration and a search space set configuration, or a PDSCH configuration including a demodulation reference signal (DMRS) configuration and a time-frequency resource allocation configuration. The uplink configurations UL1 or UL2 may be a PUCCH configuration or a PUSCH configuration.

In some aspects, the shared uplink configuration may include a PUCCH configuration of the cooperative UE. For example, the PUCCH configuration may configure a number of PUCCH resources, the PUCCH format and the power control parameters for each PUCCH resource. When indicated, the cooperative UE (e.g., CPE 507) can transmit UCI for the target UE (e.g., first target 504-1, second target 504-2).

In some aspects, the shared uplink configuration may include a PUSCH configuration of the cooperative UE. For example, the PUSCH configuration may configure a number of DMRS configurations, a number of antenna ports, the power control parameters, time or frequency resource configuration and waveform to the PUSCH. When indicated, the cooperative UE (e.g., CPE 507) can transmit uplink data for the target UE (e.g., first target 504-1, second target 504-2).

In some aspects, the shared uplink configuration may include a PUCCH configuration of the UE and the PUSCH configuration of the cooperative UE. When indicated, the cooperative UE (e.g., CPE 507) can transmit both UCI and uplink data for the target UE (e.g., first target 504-1, second target 504-2).

In some aspects, the uplink transmission of the cooperative UE/panel (e.g., CPE 507) and the target UE/panel (e.g., first target UE 504-1, second target UE 504-2) may be on different component carriers. In other aspects, the downlink configurations for the target UEs (e.g., first target UE 504-1, second target UE 504-2) and the cooperative UE (e.g., CPE 507) may be on a first component carrier (e.g., First Frequency Range (FR1)) and the uplink configurations for the target UEs (e.g., first target UE 504-1, second target UE 504-2) and the CPE (e.g., CPE 507) may be on a second component carrier (e.g., Second Frequency Range (FR2)).

For example, the base station 502 may transmit a signaling of DL1/UL1 to a first target UE (e.g., UE 504-1) via the access link 511 and a signaling of DL2/UL2 to the cooperative UE (e.g., CPE 507) via the access link 512. In some aspects, the base station 502 may transmit the UL1 configuration to the first target UE 504-1 via RRC configuration. In other aspects, the base station 502 may transmit the UL2 configuration to the CPE UE 507 via RRC configuration. These transmissions may be sent concurrently in some implementations, or may be sent subsequent to one another in other implementations. In some aspects, the first uplink configuration to the first target UE 504-1 (and/or to the second target UE 504-2 via the access link 513) may be a simplified message that includes only a pointer to the second uplink configuration of the cooperative UE (e.g., CPE 507). In this regard, the first target UE 504-1 and the CPE 507 may be aware that the first target UE 504-1 has an uplink pointer to the second uplink configuration of the CPE 507. Because the cooperation between a target UE and the cooperative UE is already established, the CPE 507 can transmit a scheduled uplink transmission for the first target UE 504-1 (and/or the second target UE 504-2). At some point, there is an information exchange between the cooperative UE and the target UE so that the cooperative UE can transmit the scheduled uplink transmission for the target UE. For example, the target UE may send control signaling (e.g., UCI) of the target UE and/or uplink data of the target UE to the cooperative UE.

In some aspects, if the target UE (e.g., first target UE 504-1, the second target UE 504-2) receives a pointer, then the cooperative UE (e.g., the CPE 507) may share its uplink configuration (e.g., the second uplink configuration) with the target UE. In other aspects, if the first uplink configuration (UL1) to the target UE (e.g., first target 504-1) contains a duplicate version of the second uplink configuration (UL2), then the CPE 507 may refrain from sharing the second uplink configuration with the target UE. In some aspects, the target UE (e.g., the first target UE 504-1, the second target UE 504-2) may determine that the second uplink configuration is provided in the second frequency range (e.g., FR2). In some aspects, the cooperative UE (e.g., the CPE 507) may share its UL2 configuration with the target UE (e.g., 504-1, 504-2) via a RRC message. In some aspects, the target UE may forward the UL2 pointer (received via the UL1 configuration) to the CPE 507, and in return, the CPE 507 sends the UL2 configuration to the target UE (e.g., first target UE 504-1, second target 504-2). In some aspects, the base station 502 sends a duplicate copy of the UL2 configuration via the UL1 configuration to the target UE.

Figure 6B:
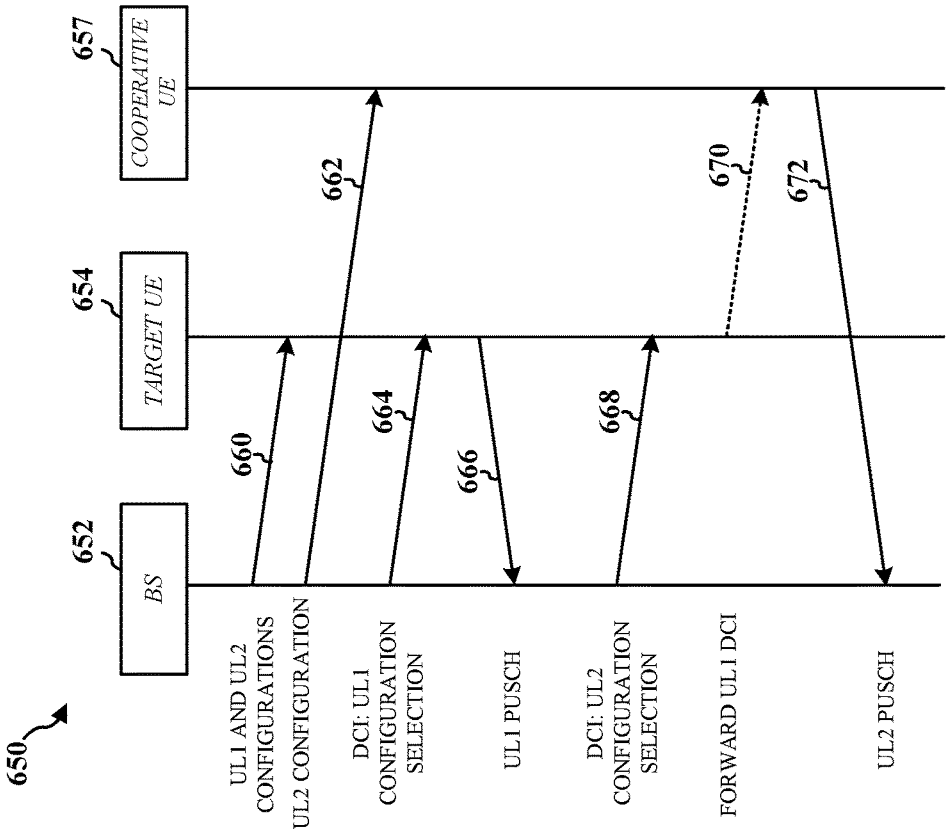
FIGS. 6A and 6B are communication flow diagrams illustrating extending uplink communications by UE cooperation, in accordance with one or more of aspects of the present disclosure.
Figure 6A:
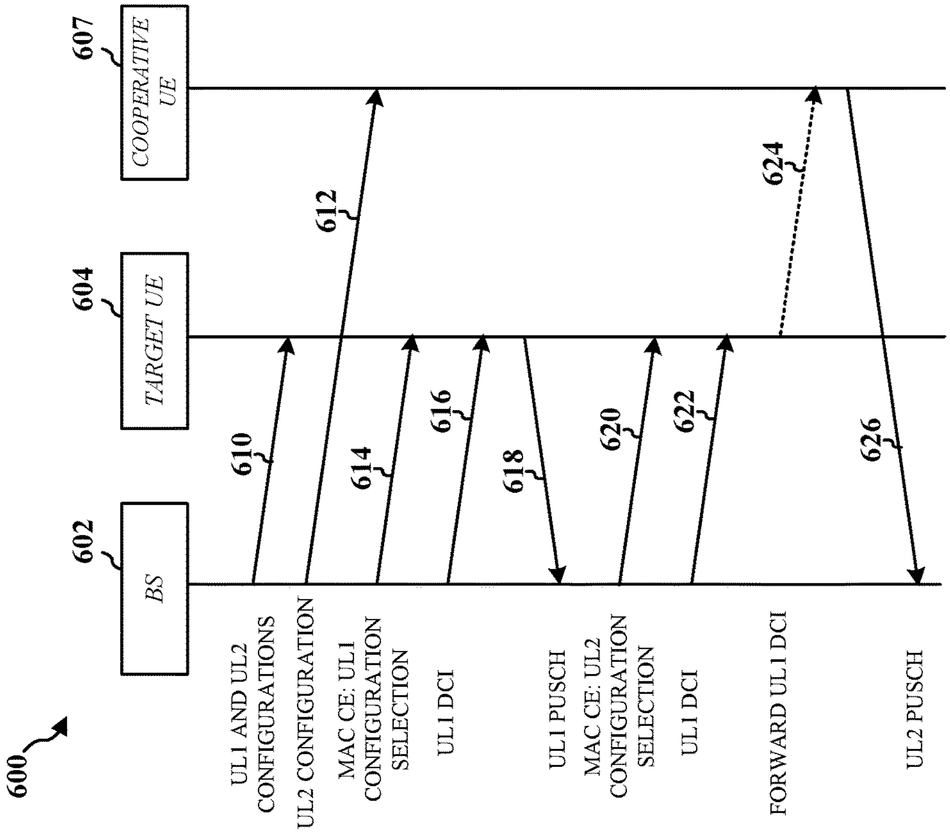

FIGS. 6A and 6B are communication flow diagrams illustrating extending uplink communications by UE cooperation, in accordance with one or more of aspects of the present disclosure. As shown in FIG. 6A, a target UE 604 and a cooperative UE 607 may communicate with one another via a sidelink channel. In one or more implementations, the communication link between the target UE 604 and the cooperative UE 607 can be WiFi, Bluetooth, sidelink, or a proprietary channel. In a dual connectivity mode, a base station 602 may communicate with the target UE 604 via a first access link. Additionally, the base station 602 may communicate with the cooperative UE 607 via a second access link.

In one or more implementations, to extend uplink communications by UE cooperation, a target UE (or panel of the target UE) can receive an indication from the base station 602 via RRC signaling. When the target UE (or panel of the UE) is indicated with a selection of an uplink configuration of a cooperative UE, the cooperative UE can transmit a scheduled uplink transmission for the target UE.

In some aspects, to schedule an uplink transmission of the target UE/panel to be transmitted by a cooperative UE/panel, the base station 602 may transmit an indication. In some aspects, the indication may be provided within a DCI that includes a dedicated field (e.g., DCI field that includes a single-bit or multi-bit field). For example, a DCI field value of "1" may denote an uplink configuration of the cooperative UE/panel is applied and the corresponding uplink communication is to be transmitted by the cooperative UE/panel for the target UE. Alternatively, the DCI field value of "0" may denote an uplink configuration of the target UE/panel is applied and the corresponding uplink communication is to be transmitted by the target UE/panel.

Additionally, or alternatively, the DCI includes an inter-UE/panel transmission configuration indicator (TCI) indication. For example, if the DCI field indicates a TCI state that is in a TCI list from the cooperative UE/panel, then the uplink configuration of the cooperative UE/panel is applied and the corresponding uplink communication is to be transmitted by the cooperative UE/panel. Alternatively, if the DCI field indicates a TCI state that is in a TCI list from the target UE/panel, then the uplink configuration of the target UE/panel is applied and the corresponding uplink communication is transmitted by the target UE/panel.

Additionally, or alternatively, the base station 604 may transmit the indication in a media access control (MAC) control element (MAC-CE) portion of a downlink shared channel (e.g., PDSCH) or RRC signaling. For example, the indication in the MAC-CE can activate (or switch between) the uplink configuration of a cooperative UE/panel (e.g., cooperative UE 607) and the uplink configuration of a target UE/panel (e.g., target UE 604).

As illustrated in FIG. 6A, at 610, the base station 602 transmits uplink configurations UL1 and UL2 to the target UE 604, where the uplink configuration UL1 corresponds to the uplink configuration of the target UE 604 and the uplink configuration UL2 corresponds to the uplink configuration of the cooperative UE 607. In this regard, the target UE 604 can process each of the two uplink configurations for two potential uplink transmissions (e.g., a first uplink transmission by the target UE 604 and a second uplink transmission by the cooperative UE 607), wherein the second uplink transmission would be performed by the cooperative UE 607 on behalf of the target UE 604. At 612, the base station 602 transmits the uplink configuration UL2 to the cooperative UE 607.

At 614, the base station 602 may transmit a downlink signal that includes a MAC-CE portion to the target UE 604. In some aspects, the MAC-CE can indicate a selection between the two uplink configurations. For example, at 614, the MAC-CE indicates the selection of the uplink configuration UL1, which pertains to the target UE 604. At 616, the base station 602 transmits a DCI (depicted as "UL1 DCI") containing an uplink resource allocation to the target UE 604. Since the uplink configuration UL1 is selected via the MAC-CE, the target UE 604 is then activated to transmit a PUSCH signal on resources provided in the DCI. For example, at 618, the target UE 604 transmits the PUSCH signal to the base station 602.

In some aspects, the base station 602 may transmit another MAC-CE at a later time, where the subsequent MAC-CE may select a different UL configuration. For example, at 620, the base station 602 transmits another PDSCH signal containing a MAC-CE portions that indicates selection of the uplink configuration UL2, which pertains to the cooperative UE 607. At 622, the base station 602 transmits a corresponding DCI that includes uplink resources for transmission of a PUSCH signal by the cooperative UE 607. Upon receipt of the MAC-CE at 620, the target UE 604 may determine that the uplink configuration of the cooperative UE 607 is applied and, therefore, the cooperative UE 607 is to transmit an uplink communication to the base station 602 on behalf of the target UE 604. In this regard, the target UE 604 can share the uplink resource allocation as provided in the DCI at 622 with the cooperative UE 607 so that the cooperative UE 607 can transmit the uplink signal on resources the base station 602 expects to receive. As such, at 614, the cooperative UE 607 transmits the uplink signal to base station 602 on behalf of the target UE 604 in order to extend uplink communications of the target UE 604 by UE cooperation between the cooperative UE 607 and the target UE 604.

As shown in FIG. 6B, a target UE 654 and a cooperative UE 657 may communicate with one another via a sidelink channel. In one or more implementations, the communication link between the target UE 654 and the cooperative UE 657 can be WiFi, Bluetooth, sidelink, or a proprietary channel. In a dual connectivity mode, a base station 652 may communicate with the target UE 654 via a first access link. Additionally, the base station 652 may communicate with the cooperative UE 657 via a second access link.

As described above, the selection between a first uplink configuration of the target 654 and a second uplink configuration of the cooperative UE 657 may be provided via the DCI. As illustrated in FIG. 6A, at 660, the base station 652 transmits uplink configurations UL1 and UL2 to the target UE 654, where the uplink configuration UL1 corresponds to the uplink configuration of the target UE 654 and the uplink configuration UL2 corresponds to the uplink configuration of the cooperative UE 657. In this regard, the target UE 654 can process each of the two uplink configurations for two potential uplink transmissions (e.g., a first uplink transmission by the target UE 654 and a second uplink transmission by the cooperative UE 657), wherein the second uplink transmission would be performed by the cooperative UE 657 on behalf of the target UE 654. At 662, the base station 652 transmits the uplink configuration UL2 to the cooperative UE 657.

At 664, the base station 652 may transmit a downlink signal that includes a DCI (depicted as "UL1 DCI") containing an uplink resource allocation to the target UE 654. Unlike in FIG. 6A, the DCI at 664 includes a selection between the first uplink configuration (e.g., UL1) and the second uplink configuration (e.g., UL2). The DCI may include the dedicated field or TCI state information. In this regard, the DCI indicates a selection of the uplink configuration UL1. Since the uplink configuration UL1 is selected via the DCI, the target UE 654 is then activated to transmit a PUSCH signal on resources provided in the DCI. For example, at 666, the target UE 654 transmits the PUSCH signal to the base station 652.

In some aspects, the base station 652 may transmit another DCI at a later time, where the subsequent DCI may select a different UL configuration. For example, at 668, the base station 652 transmits another PDCCH signal containing a DCI that indicates selection of the uplink configuration UL2, which pertains to the cooperative UE 657. The DCI at 668 can include uplink resources for transmission of a PUSCH signal by the cooperative UE 657. Upon receipt of the DCI at 668, the target UE 654 may determine that the uplink configuration of the cooperative UE 657 is applied and, therefore, the cooperative UE 657 is to transmit an uplink communication to the base station 652 on behalf of the target UE 654. In this regard, the target UE 654 can share the uplink resource allocation as provided in the DCI at 670 with the cooperative UE 657 so that the cooperative UE 67 can transmit the uplink signal on resources the base station 652 expects to receive. As such, at 672, the cooperative UE 657 transmits the uplink signal to base station 652 on behalf of the target UE 654 in order to extend uplink communications of the target UE 654 by UE cooperation between the cooperative UE 657 and the target UE 654.

Figure 7:
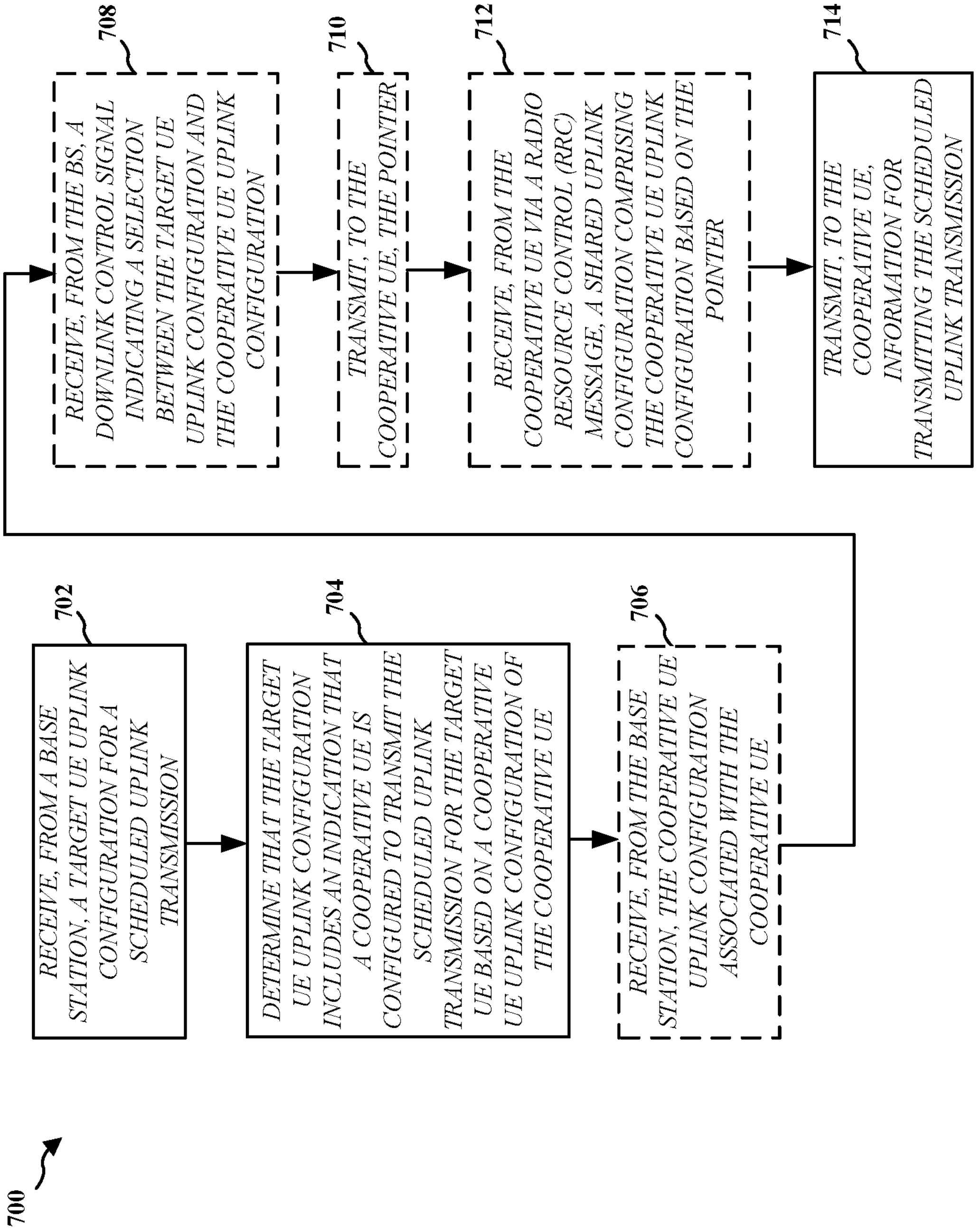
FIG. 7 is a flowchart of a process of wireless communication at a user equipment, in accordance with one or more of aspects of the present disclosure.

FIG. 7 is a flowchart of a process 700 of wireless communication at a user equipment, in accordance with one or more of aspects of the present disclosure. The process 700 may be performed by a UE (e.g., the UE 104, 450, 504-1, 504-2, 604, 654; the apparatus 1002, which may include memory, a cellular baseband processor 904, and one or more components configured to perform the process 700). As illustrated, the process 700 includes a number of enumerated steps, but embodiments of the process 700 may include additional steps before, after, and in between the enumerated steps. In some embodiments, one or more of the enumerated steps may be omitted or performed in a different order. Optional aspects are illustrated with a dashed line. The process 700 enables a wireless communication device to facilitate dual connectivity with Uu direct link connections and sidelink-based relays between UEs and a core network.

At 702, the UE may receive, from a base station, a target UE uplink configuration for a scheduled uplink transmission. The UE receives the target UE uplink configuration, e.g., by the uplink configuration component 1040 of the apparatus 1002 through coordination with the reception component 1030 of the apparatus 1002 in FIG. 10.

At 704, the UE may determine that the target UE uplink configuration includes an indication that a cooperative UE is configured to transmit the scheduled uplink transmission for the first UE based on a cooperative UE uplink configuration of the cooperative UE. The UE determines that the target UE uplink configuration includes the indication, e.g., by the uplink configuration component 1040 of the apparatus 1002 in FIG. 10.

At 706, the UE may receive, from the base station, a cooperative UE uplink configuration for a scheduled uplink transmission. The UE receives the target UE uplink configuration, e.g., by the uplink configuration component 1040 of the apparatus 1002 through coordination with the reception component 1030 of the apparatus 1002 in FIG. 10. In some aspects, the UE may receive, from the cooperative UE via a radio resource control (RRC) message, a shared uplink configuration comprising the cooperative UE uplink configuration based on the pointer. In some aspects, the UE may receive, from the base station in a first frequency range, a downlink configuration. In some aspects, the UE may receive the target UE uplink configuration comprises receiving, from the base station in a second frequency range different than the first frequency range, the target UE uplink configuration. In some aspects, the UE may receive, from the BS, the target UE uplink configuration and the cooperative UE uplink configuration.

At 708, the UE may receive, from the BS, a downlink control signal indicating a selection between the target UE uplink configuration and the cooperative UE uplink configuration. The UE receives the downlink control signal, e.g., by the target UE cooperation component 1042 of the apparatus 1002 through coordination with the reception component 1030 of the apparatus 1002 in FIG. 10. In some aspects, the downlink control signal includes a media access control-control element, in which the selection may be indicated by at least a portion of the MAC-CE. In other aspects, the downlink control signal includes a downlink control information, in which the selection may be indicated by a dedicated field in the DCI. In some aspects, the selection may be indicated by a transmission configuration indicator state in the DCI. For example, the selection of the target UE uplink configuration may be based on the TCI state being in a TCI list associated with the first UE. In another example, the selection of the cooperative UE uplink configuration may be based on the TCI state being in a TCI list associated with the cooperative UE.

At 710, the UE may transmit, to the cooperative UE, the pointer. The UE transmits the pointer, e.g., by the target UE cooperation component 1042 of the apparatus 1002 through coordination with the transmission component 1034 of the apparatus 1002 in FIG. 10.

At 712, the UE may receive, from the cooperative UE via a radio resource control (RRC) message, a shared uplink configuration comprising the cooperative UE uplink configuration based on the pointer. The receives the shard uplink configuration, e.g., by the target UE cooperation component 1042 of the apparatus 1002 through coordination with the reception component 1030 of the apparatus 1002 in FIG. 10. In some aspects, the shared uplink configuration includes a physical uplink control channel (PUCCH) configuration of the cooperative UE. In some aspects, the shared uplink configuration includes a physical uplink shared channel configuration of the cooperative UE. In some aspects, the shared uplink configuration includes the physical uplink control channel configuration and the physical uplink shared channel configuration of the cooperative UE.

At 714, the UE may transmit, to the cooperative UE, information for transmitting the scheduled uplink transmission. The transmit the information, e.g., by the target UE cooperation component 1042 of the apparatus 1002 through coordination with the transmission component 1034 of the apparatus 1002 in FIG. 10.

Figure 8:
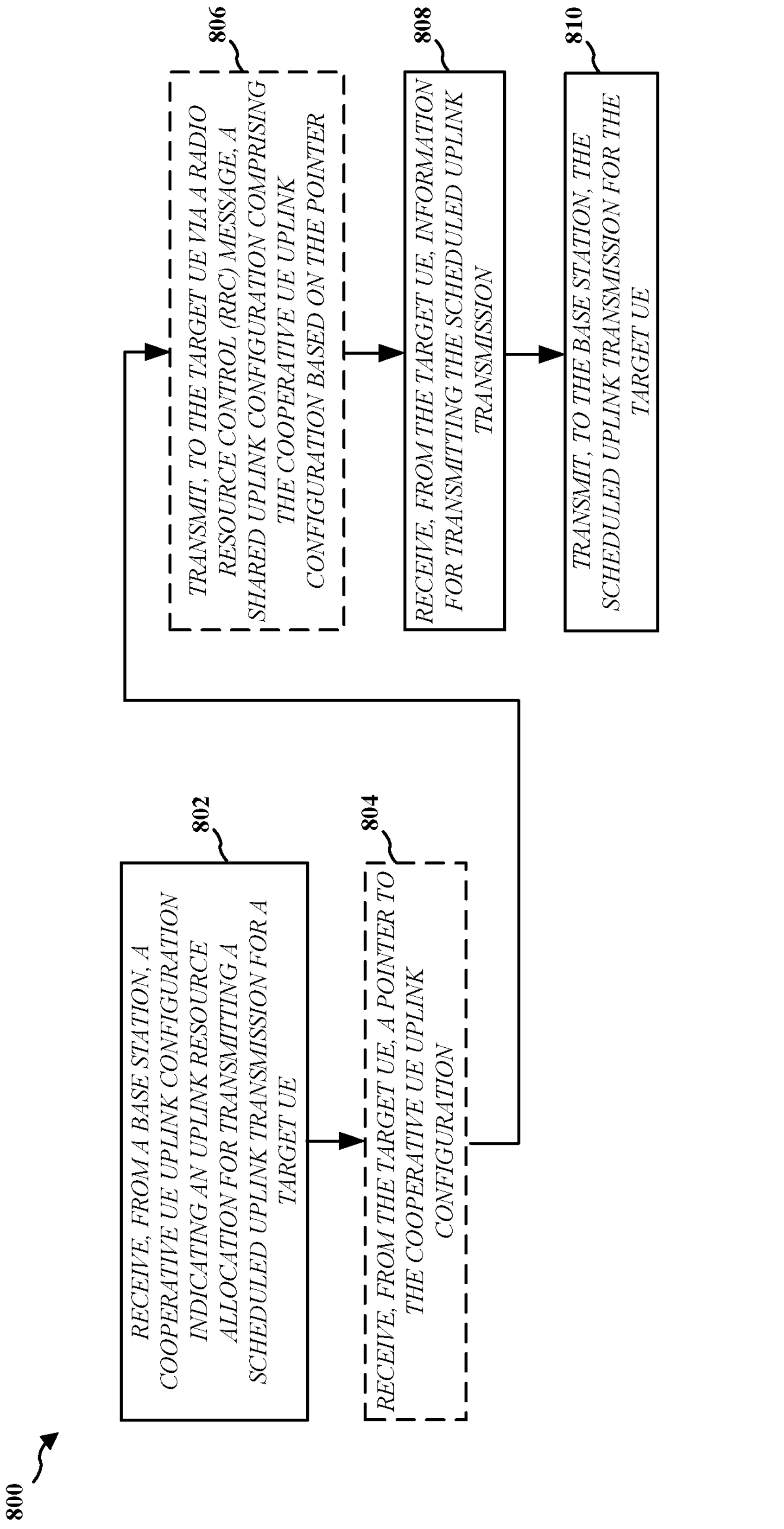
FIG. 8 is a flowchart of a process of wireless communication at a customer premises equipment, in accordance with one or more of aspects of the present disclosure.

FIG. 8 is a flowchart of a process 800 of wireless communication at a customer premises equipment (CPE), in accordance with one or more of aspects of the present disclosure. The process 800 may be performed by a CPE (e.g., the CPE 107; device 450; CPE 507; cooperative UE 607, 657; the apparatus 1102, which may include memory, a cellular baseband processor 904, and one or more components configured to perform the 800). As illustrated, the process 800 includes a number of enumerated steps, but embodiments of the process 800 may include additional steps before, after, and in between the enumerated steps. In some embodiments, one or more of the enumerated steps may be omitted or performed in a different order. Optional aspects are illustrated with a dashed line.

At 802, the CPE may receive, from a base station, a cooperative UE uplink configuration indicating an uplink resource allocation for transmitting a scheduled uplink transmission for a target UE. The CPE receives the cooperative UE uplink configuration, e.g., by the uplink configuration component 1140 of the apparatus 1102 through coordination with the reception component 1130 of the apparatus 1102 in FIG. 11.

At 804, the CPE may receive, from the target UE, a pointer to the cooperative UE uplink configuration. The CPE receives the pointer, e.g., by the cooperative UE cooperation component 1142 through coordination with the reception component 1130 of the apparatus 1102 in FIG. 11.

At 806, the CPE may transmit, to the target UE via a radio resource control message, a shared uplink configuration comprising the target UE uplink configuration based on the pointer. The CPE transmits the shared uplink configuration, e.g., by the cooperative UE cooperation component 1142 through coordination with the transmission component 1134 of the apparatus 1102 in FIG. 11. In some aspects, the shared uplink configuration includes the PUCCH configuration of the CPE. In other aspects, the shared uplink configuration includes the PUSCH configuration of the CPE. In still other aspects, the shared uplink configuration includes a combination of the PUCCH configuration and the PUSCH configuration of the CPE.

At 808, the CPE may receive, from the target UE, information for transmitting the scheduled uplink transmission. The CPE receives the information from the target UE, e.g., by the cooperative UE cooperation component 1142 through coordination with the reception component 1130 of the apparatus 1102 in FIG. 11.

At 810, the CPE may transmit, to the base station, the scheduled uplink transmission for the target UE. The CPE transmits the scheduled uplink transmission, e.g., by the transmission component 1134 of the apparatus 1102 through coordination with the cooperative UE cooperation component 1142 of the apparatus 1102 in FIG. 11. In some aspects, the scheduled uplink transmission is transmitted with a UCI of the UE based on the PUCCH configuration of the CPE. In other aspects, the scheduled uplink transmission is transmitted with uplink data of the UE based on the PUSCH configuration of the CPE. In still other aspects, the scheduled uplink transmission is transmitted with a UCI of the UE based on the PUCCH configuration of the CPE and uplink data of the UE based on the PUSCH configuration of the CPE.

Figure 9:
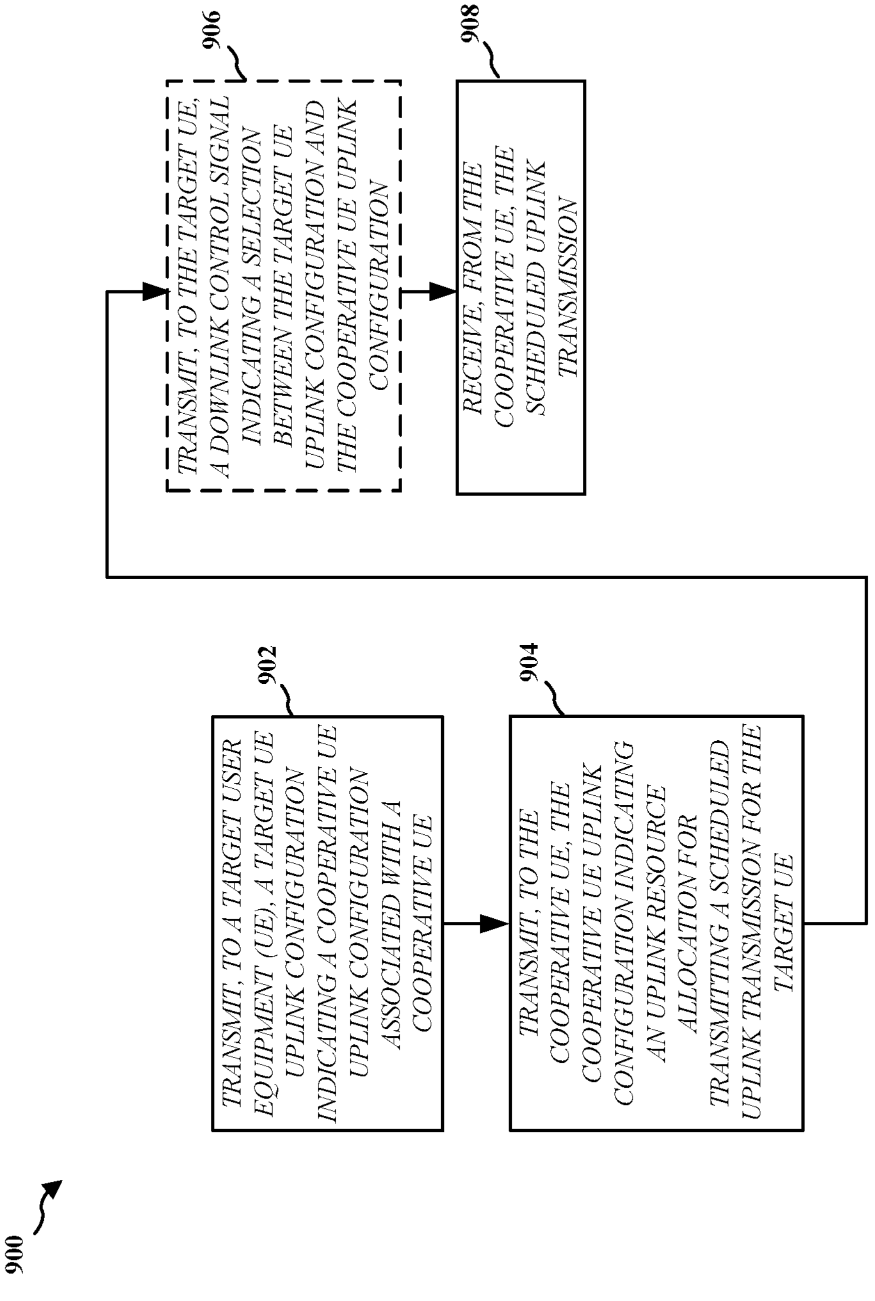
FIG. 9 is a flowchart of a process of wireless communication at a base station, in accordance with one or more of aspects of the present disclosure.

FIG. 9 is a flowchart of a process 900 of wireless communication at a base station, in accordance with one or more of aspects of the present disclosure. The process 900 may be performed by a base station (e.g., the BS 102, 180, 410, 502, 602, 652; the apparatus 1202, which may include memory, a cellular baseband processor 1004, and one or more components configured to perform the process 900). As illustrated, the process 900 includes a number of enumerated steps, but embodiments of the process 900 may include additional steps before, after, and in between the enumerated steps. In some embodiments, one or more of the enumerated steps may be omitted or performed in a different order. Optional aspects are illustrated with a dashed line. The process 900 enables a wireless communication device to facilitate dual connectivity with Uu direct link connections and sidelink-based relays between UEs and a core network.

At 902, the base station may transmit, to a first user equipment (e.g., the UE 104), a target UE uplink configuration indicating a cooperative UE uplink configuration associated with a cooperative UE (e.g., the CPE 107). The UE transmits the target UE uplink configuration, e.g., by the target UE configuration component 1240 of the apparatus 1202 through coordination with the transmission component 1234 of the apparatus 1202 in FIG. 12. In some aspects, the target UE uplink configuration includes a pointer to the cooperative UE uplink configuration. In some aspects, the target UE uplink configuration includes a duplicate copy of the cooperative UE uplink configuration. In some implementations, the base station may transmit, to the first UE, the target UE uplink configuration concurrently with the cooperative UE uplink configuration in same message or in separate messages depending on implementation.

At 904, the base station may transmit, to a cooperative UE, the cooperative UE uplink configuration indicating an uplink resource allocation for transmitting a scheduled uplink transmission for the first UE. The base station transmits the cooperative UE uplink configuration, e.g., by the cooperative UE configuration component 1242 of the apparatus 1202 through coordination with the transmission component 1234 of the apparatus 1202 in FIG. 12.

At 906, the base station may transmit, to the first UE, a downlink control signal indicating a selection between the target UE uplink configuration and the cooperative UE uplink configuration. The base station transmits the downlink control signal, e.g., by the target UE configuration component 1240 of the apparatus 1202 through coordination with the transmission component 1234 of the apparatus 1202 in FIG. 12. In some aspects, the downlink control signal includes a MAC-CE portion. In some aspects, the downlink control signal includes a DCI with a dedicated field providing the selection. In other aspects, the DCI includes TCI state information to provide the selection.

At 908, the base station may receive, from the cooperative UE, the scheduled uplink transmission. The base station may receive the scheduled uplink transmission, e.g., by the cooperative UE configuration component 1242 of the apparatus 1202 through coordination with the reception component 1230 of the apparatus 1202 in FIG. 12. In some aspects, the base station may receive, from the cooperative UE, a physical uplink shared channel based on the downlink control signal indicating a selection of the cooperative UE uplink configuration.

Figure 10:
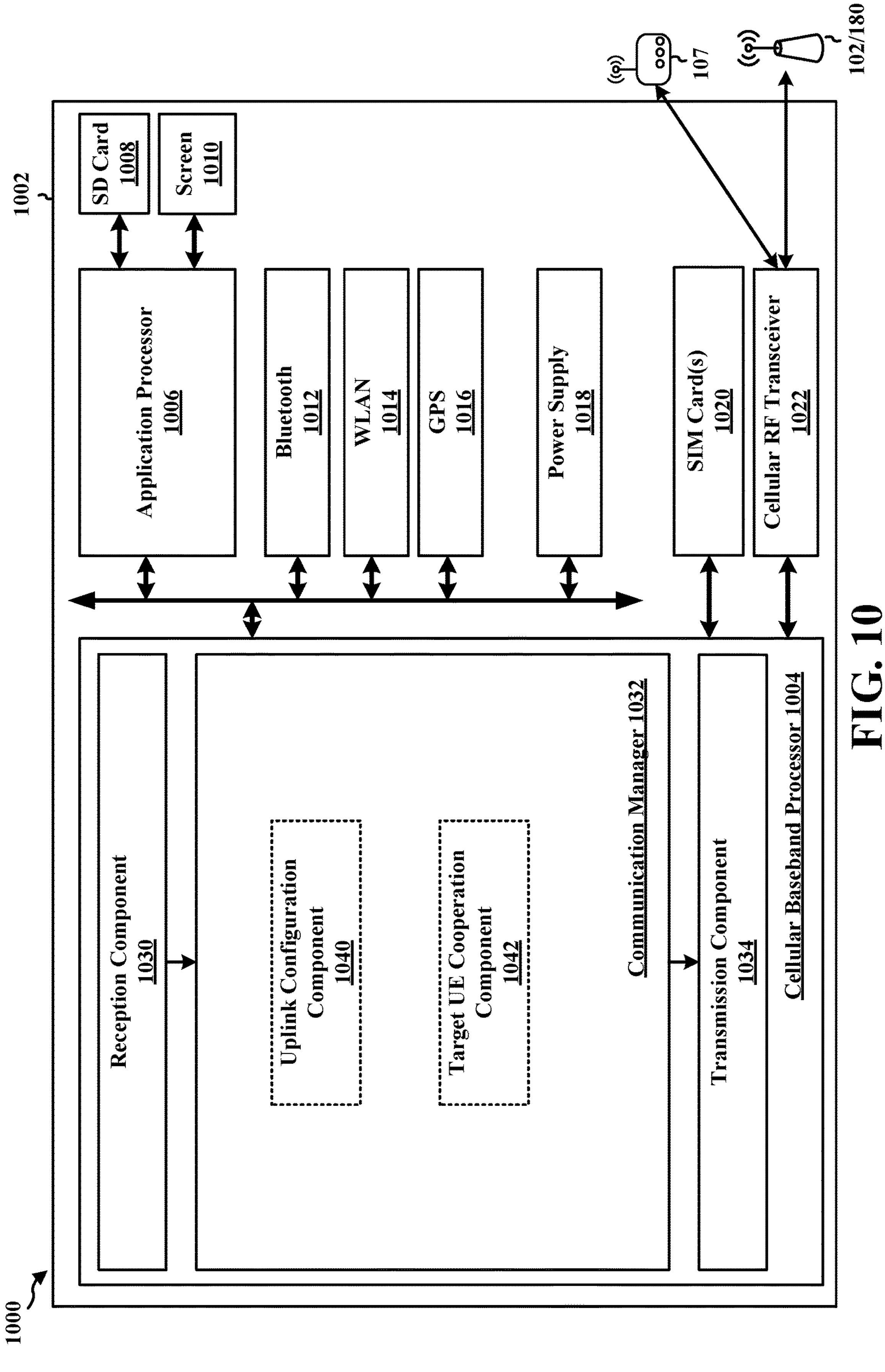
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE or other wireless device that communicates based on Uu direct link and/or sidelink. The apparatus 1002 includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with other wireless devices, such as a UE 104 and/or base station 102/180. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the device 450 and may include the memory 460 and/or at least one of the TX processor 468, the RX processor 456, and the controller/processor 459. In one configuration, the apparatus 1002 may be a modem chip and include just the baseband processor 1004, and in another configuration, the apparatus 1002 may be the entire wireless device (e.g., see the device 450 of FIG. 4) and include the additional modules of the apparatus 1002.

The communication manager 1032 includes an uplink configuration component 1040 and/or a target UE cooperation component 1042 configured to perform the aspects described in connection with a process in FIG. 7. The apparatus is illustrated as including components to perform the process of FIG. 7, because the wireless device may operate as a transmitting device at times and may operate as a receiving device at other times.

The apparatus 1002 may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus 1002 may further include means for receiving, from a base station, a target UE uplink configuration for a scheduled uplink transmission. The apparatus 1002 includes means for determining that the target UE uplink configuration includes an indication that a cooperative UE is configured to transmit the scheduled uplink transmission for the first UE based on a cooperative UE uplink configuration of the cooperative UE. The apparatus 1002 also includes means for transmitting, to the cooperative UE, information for transmitting the scheduled uplink transmission.

In some aspects, the apparatus 1002 includes means for transmitting, to the cooperative UE, a pointer to the cooperative UE uplink configuration. The apparatus 1002 also may include means for receiving, from the cooperative UE via a radio resource control message, a shared uplink configuration comprising the cooperative UE uplink configuration based on the pointer.

The aforementioned means may be one or more of the aforementioned components of the apparatus 1002 configured to perform the functions recited by the aforementioned means. As described supra, the apparatus 1002 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 11:
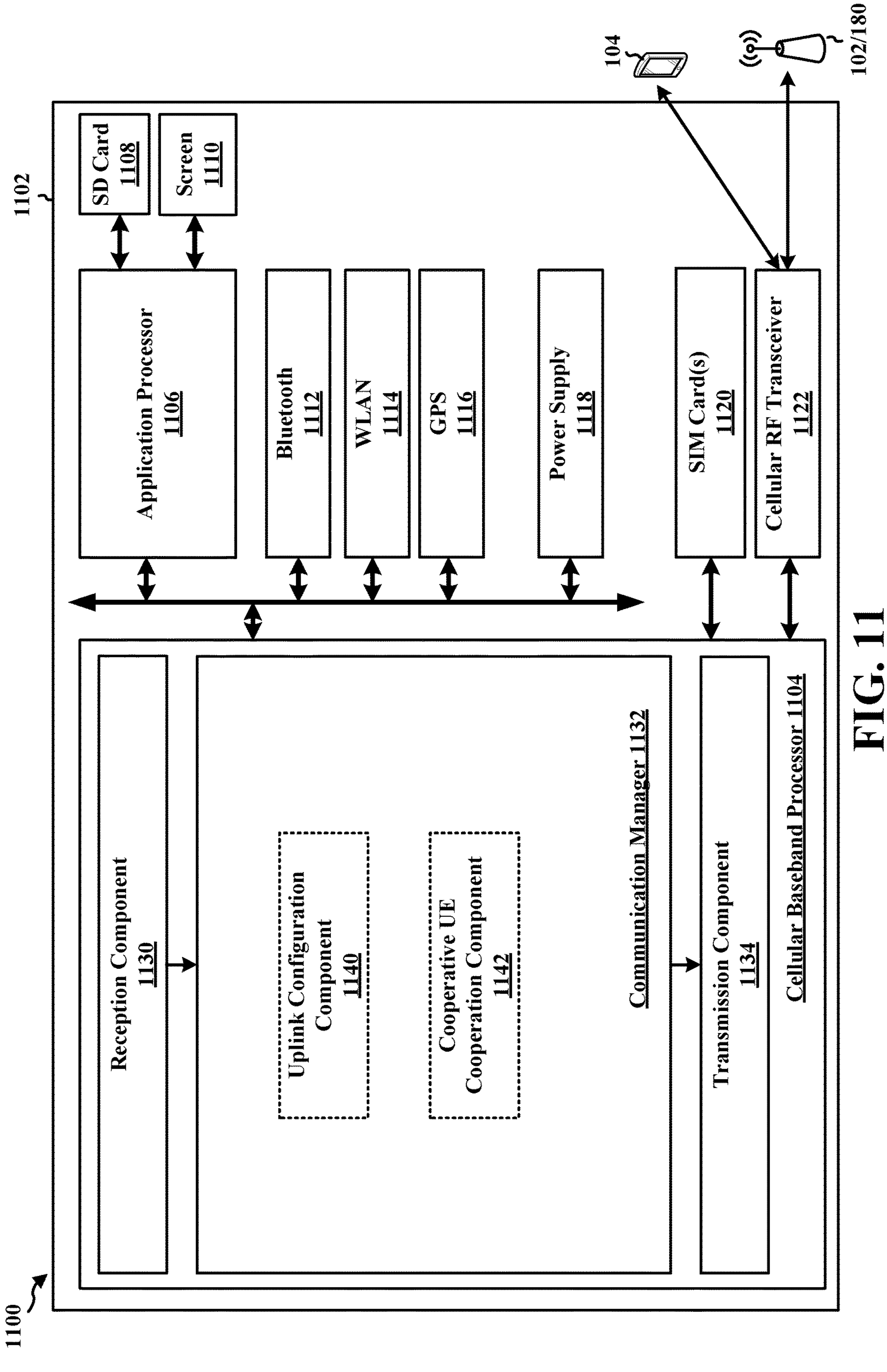
FIG. 11 is a diagram illustrating an example of a hardware implementation for an example apparatus.

FIG. 11 is a diagram 1100 illustrating an example of a hardware implementation for an apparatus 1102. The apparatus 1102 may be a CPE or other wireless device that communicates based on Uu direct link and/or sidelink. The apparatus 1102 includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with other wireless devices, such as a UE 104 and/or base station 102/180. The cellular baseband processor 1104 may include a computer-readable medium/memory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the device 450 and may include the memory 460 and/or at least one of the TX processor 468, the RX processor 456, and the controller/processor 459. In one configuration, the apparatus 1102 may be a modem chip and include just the baseband processor 1104, and in another configuration, the apparatus 1102 may be the entire wireless device (e.g., see the device 450 of FIG. 4) and include the additional modules of the apparatus 1102.

The communication manager 1132 includes an uplink configuration component 1140 and/or a cooperative UE cooperation component 1142 configured to perform the aspects described in connection with the process in FIG. 8. The apparatus is illustrated as including components to perform the process in FIG. 8, because the CPE may operate as a transmitting device at times and may operate as a receiving device at other times.

The apparatus 1102 may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from a base station, a cooperative UE uplink configuration indicating an uplink resource allocation for transmitting a scheduled uplink transmission for a target UE. The apparatus 1102 may include means for receiving, from the target UE, information for transmitting the scheduled uplink transmission. The apparatus 1102 also may include means for transmitting, to the base station, the scheduled uplink transmission for the target UE.

The aforementioned means may be one or more of the aforementioned components of the apparatus 1102 configured to perform the functions recited by the aforementioned means. As described supra, the apparatus 1102 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 12:
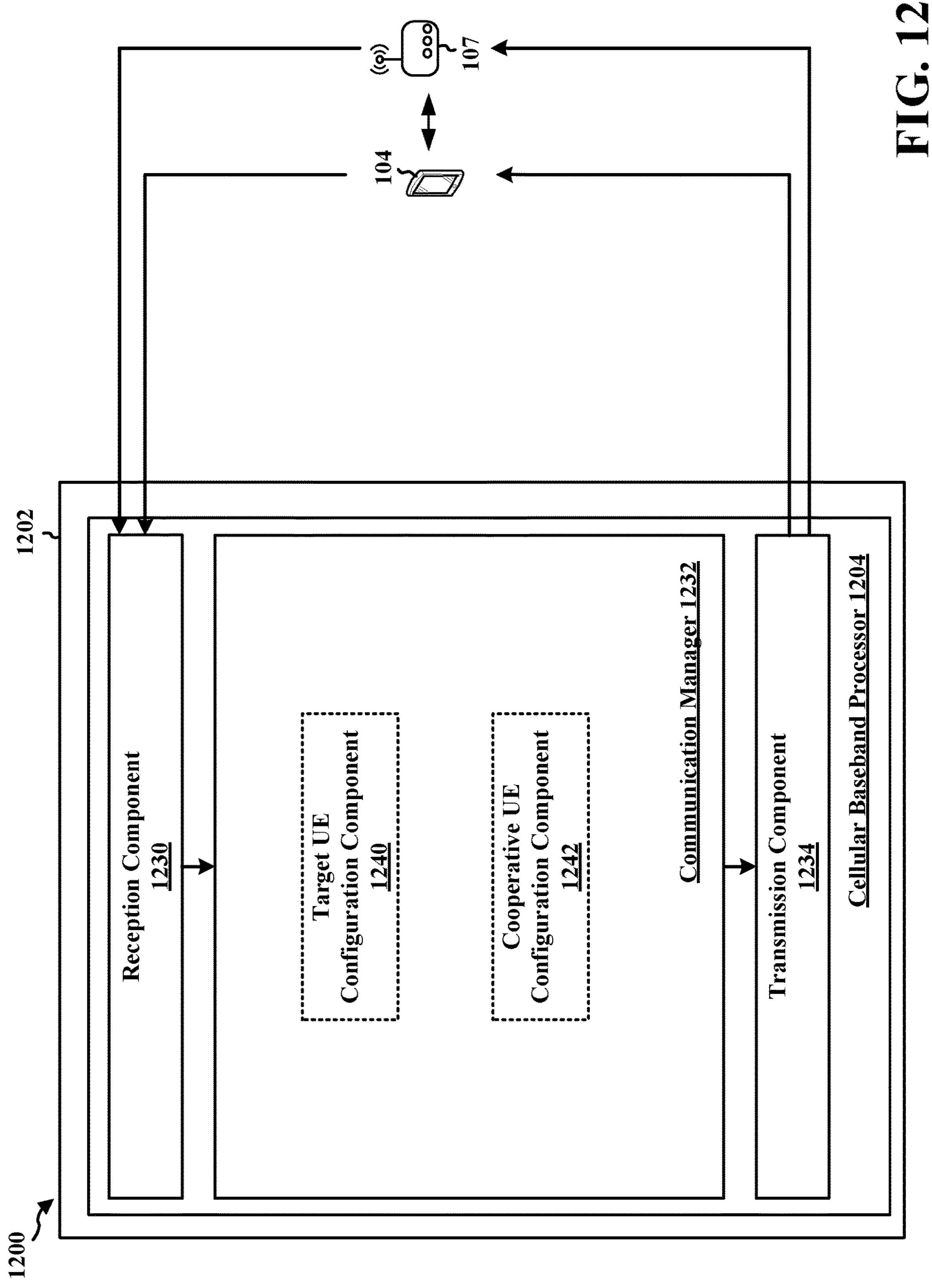
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station or other wireless device that communicates based on downlink/uplink. The apparatus 1202 includes a cellular baseband processor 1204 (also referred to as a modem) coupled to a RF transceiver 1224, a processor 1220 and a memory 1222. The cellular baseband processor 1204 communicates through the RF transceiver 1224 with other wireless devices, such as a UE 104. The cellular baseband processor 1204 may include a computer-readable medium/memory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The processor 1220 is responsible for general processing, including the execution of software stored on the computer-readable medium/memory 1222. The software, when executed by the processor 1220, causes the apparatus 1202 to perform the various functions described supra for any particular apparatus. The computer-readable medium/memory 1222 may also be used for storing data that is manipulated by the processor 1220 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the device 410 and may include the memory 476 and/or at least one of the TX processor 416, the RX processor 470, and the controller/processor 475. In one configuration, the apparatus 1202 may be a modem chip and include just the baseband processor 1204, and in another configuration, the apparatus 1202 may be the entire wireless device (e.g., see the device 410 of FIG. 4) and include the additional modules of the apparatus 1202.

The communication manager 1232 includes a target UE configuration component 1240 and/or a cooperative UE configuration component 1242 configured to perform the aspects described in connection with methods in FIG. 9. The apparatus is illustrated as including components to perform the method of FIG. 9, because the wireless device may operate as a transmitting device at times and may operate as a receiving device at other times. In other examples, the apparatus 1202 may include components for the method of FIG. 9.

The apparatus 1202 may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for transmitting, to a first user equipment, a target UE uplink configuration indicating a cooperative UE uplink configuration associated with a second UE. The apparatus 1202 may further include means for transmitting, to a second UE, the cooperative UE uplink configuration indicating an uplink resource allocation for transmitting a scheduled uplink transmission for the first UE. The apparatus 1202 also may include means for receiving, from the second UE, the scheduled uplink transmission. The apparatus 1202 may further include means for transmitting, to the first UE, a downlink control signal indicating a selection between the target UE uplink configuration and the cooperative UE uplink configuration.

The aforementioned means may be one or more of the aforementioned components of the apparatus 1202 configured to perform the functions recited by the aforementioned means. As described supra, the apparatus 1202 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

The following examples are illustrative only and may be combined with aspects of other embodiments or teachings described herein, without limitation.

Aspect 1 is a method of wireless communication at a target user equipment that includes receiving, from a base station, a target UE uplink configuration for a scheduled uplink transmission; determining that the target UE uplink configuration includes an indication that a cooperative UE is configured to transmit the scheduled uplink transmission for the first UE based on a cooperative UE uplink configuration of the cooperative UE; and transmitting, to the cooperative UE, information for transmitting the scheduled uplink transmission.

In Aspect 2, the method of Aspect 1 further includes that the indication includes a pointer to the cooperative UE uplink configuration, further comprising: transmitting, to the cooperative UE, the pointer; and receiving, from the cooperative UE via a radio resource control (RRC) message, a shared uplink configuration comprising the cooperative UE uplink configuration based on the pointer.

In Aspect 3, the method of Aspect 1 or Aspect 2 further includes that the target UE uplink configuration comprises the cooperative UE uplink configuration, wherein the cooperative UE uplink configuration indicates an uplink resource allocation for transmitting the scheduled uplink transmission at the cooperative UE.

In Aspect 4, the method of any of Aspects 1-3 further includes that the cooperative UE uplink configuration comprises a physical uplink control channel (PUCCH) configuration of the cooperative UE.

In Aspect 5, the method of any of Aspects 1-4 further includes that the scheduled uplink transmission comprises uplink control information (UCI) based on the PUCCH configuration.

In Aspect 6, the method of any of Aspects 1-5 further includes that the cooperative UE uplink configuration comprises a physical uplink shared channel configuration of the cooperative UE.

In Aspect 7, the method of any of Aspects 1-6 further includes that the scheduled uplink transmission comprises uplink data based on the PUSCH configuration.

In Aspect 8, the method of any of Aspects 1-7 further includes that the cooperative UE uplink configuration comprises a physical uplink control channel configuration and a physical uplink shared channel configuration of the cooperative UE.

In Aspect 9, the method of any of Aspects 1-8 further includes comprising receiving, from the base station in a first frequency range, a downlink configuration, wherein the receiving the target UE uplink configuration comprises receiving, from the base station in a second frequency range different than the first frequency range, the target UE uplink configuration.

In Aspect 10, the method of any of Aspects 1-9 further includes that the receiving the target UE uplink configuration comprises receiving, from the BS, the target UE uplink configuration and the cooperative UE uplink configuration.

In Aspect 11, the method of any of Aspects 1-10 further includes comprising receiving, from the BS, a downlink control signal indicating a selection between the target UE uplink configuration and the cooperative UE uplink configuration.

In Aspect 12, the method of any of Aspects 1-11 further includes that the downlink control signal comprises a media access control (MAC) control element (MAC-CE), wherein the selection is indicated by at least a portion of the MAC-CE.

In Aspect 13, the method of any of Aspects 1-12 further includes that the downlink control signal comprises a downlink control information (DCI), wherein the selection is indicated by a dedicated field in the DCI.

In Aspect 14, the method of any of Aspects 1-13 further includes that the downlink control signal comprises a downlink control information (DCI), wherein the selection is indicated by a transmission configuration indicator (TCI) state in the DCI, wherein the selection of the target UE uplink configuration is based on the TCI state being in a TCI list associated with the first UE, and wherein the selection of the cooperative UE uplink configuration is based on the TCI state being in a TCI list associated with the cooperative UE.

In Aspect 15, the method of any of Aspects 1-16 further includes that the transmitting the information for transmitting the scheduled uplink transmission comprises transmitting, to the cooperative UE, at least a portion of the downlink control signal that includes downlink control information associated with the first UE when the downlink control signal indicates the selection of the cooperative UE uplink configuration.

Example 16 is a device including one or more processors and one or more memories in electronic communication with the one or more processors storing instructions executable by the one or more processors to cause a system or an apparatus to implement a method as in any of Examples 1 to 15.

Example 17 is a system or apparatus including means for implementing a method or realizing an apparatus as in any of Examples 1 to 15.

Example 18 is a non-transitory computer-readable medium storing instructions executable by one or more processors to cause the one or more processors to implement a method as in any of Examples 1 to 15.

Aspect 19 is a method of wireless communication at a BS that includes transmitting, to a first user equipment, a target UE uplink configuration indicating a cooperative UE uplink configuration associated with a cooperative UE; transmitting, to a cooperative UE, the cooperative UE uplink configuration indicating an uplink resource allocation for transmitting a scheduled uplink transmission for the first UE; and receiving, from the cooperative UE, the scheduled uplink transmission.

In Aspect 20, the method of Aspect 19 further includes that the target UE uplink configuration comprises a pointer to the cooperative UE uplink configuration.

In Aspect 21, the method of Aspect 19 or Aspect 20 further includes that the target UE uplink configuration comprises a duplicate copy of the cooperative UE uplink configuration.

In Aspect 22, the method of any of Aspects 19-21 further includes that the transmitting the target UE uplink configuration comprises transmitting, to the first UE, the target UE uplink configuration and the cooperative UE uplink configuration.

In Aspect 23, the method of any of Aspects 19-22 further includes transmitting, to the first UE, a downlink control signal indicating a selection between the target UE uplink configuration and the cooperative UE uplink configuration.

In Aspect 24, the method of any of Aspects 19-23 further includes that the receiving the scheduled uplink transmission comprises receiving, from the cooperative UE, a physical uplink shared channel based on the downlink control signal indicating a selection of the cooperative UE uplink configuration.

In Aspect 25, the method of any of Aspects 19-24 further includes that the downlink control signal comprises a media access control (MAC) control element (MAC-CE).

In Aspect 26, the method of any of Aspects 19-25 further includes that the downlink control signal comprises a downlink control information (DCI), wherein the selection is indicated by a dedicated field in the DCI.

In Aspect 27, the method of any of Aspects 19-26 further includes that the downlink control signal comprises a downlink control information (DCI), wherein the selection is indicated by a transmission configuration indicator (TCI) state in the DCI, wherein the selection of the target UE uplink configuration is based on the TCI state being in a TCI list associated with the first UE, and wherein the selection of the cooperative UE uplink configuration is based on the TCI state being in a TCI list associated with the cooperative UE.

Example 28 is a device including one or more processors and one or more memories in electronic communication with the one or more processors storing instructions executable by the one or more processors to cause a system or an apparatus to implement a method as in any of Examples 19 to 27.

Example 29 is a system or apparatus including means for implementing a method or realizing an apparatus as in any of Examples 19 to 27.

Example 30 is a non-transitory computer-readable medium storing instructions executable by one or more processors to cause the one or more processors to implement a method as in any of Examples 19 to 27.

Aspect 31 is a method of wireless communication at a cooperative user equipment that includes receiving, from a base station, a cooperative UE uplink configuration indicating an uplink resource allocation for transmitting a scheduled uplink transmission for a target UE; receiving, from the target UE, information for transmitting the scheduled uplink transmission; and transmitting, to the base station, the scheduled uplink transmission for the target UE.

In Aspect 32, the method of Aspect 31 further includes that the receiving, from the target UE, a pointer to the cooperative UE uplink configuration; and transmitting, to the target UE via a radio resource control (RRC) message, a shared uplink configuration comprising the cooperative UE uplink configuration based on the pointer.

In Aspect 33, the method of Aspect 31 or Aspect 32 further includes that the cooperative UE uplink configuration comprises a physical uplink control channel (PUCCH) configuration of the first UE, wherein the scheduled uplink transmission comprises uplink control information (UCI) based on the PUCCH configuration.

In Aspect 34, the method of any of Aspects 31-33 further includes that the cooperative UE uplink configuration comprises a physical uplink shared channel configuration of the first UE, wherein the scheduled uplink transmission comprises uplink data based on the PUSCH configuration.

In Aspect 35, the method of any of Aspects 31-34 further includes that the cooperative UE uplink configuration comprises a physical uplink control channel configuration and a physical uplink shared channel configuration of the first UE.

Example 36 is a device including one or more processors and one or more memories in electronic communication with the one or more processors storing instructions executable by the one or more processors to cause a system or an apparatus to implement a method as in any of Examples 31 to 36.

Example 37 is a system or apparatus including means for implementing a method or realizing an apparatus as in any of Examples 31 to 36.

Example 38 is a non-transitory computer-readable medium storing instructions executable by one or more processors to cause the one or more processors to implement a method as in any of Examples 31 to 36.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a target user equipment (UE), comprising:
- receiving, from a base station, a target UE uplink configuration for a scheduled uplink transmission;
- determining that the target UE uplink configuration includes an indication that a cooperative UE is configured to transmit the scheduled uplink transmission for the target UE based on a cooperative UE uplink configuration of the cooperative UE;
- receiving, from the base station in a first frequency range, a downlink configuration, wherein receiving the target UE uplink configuration comprises receiving the target UE uplink configuration in a second frequency range different than the first frequency range; and
- transmitting, to the cooperative UE, information for transmitting the scheduled uplink transmission.

2. The method of claim 1, wherein the indication includes a pointer to the cooperative UE uplink configuration, and wherein the method further comprises:
- transmitting, to the cooperative UE, the pointer; and
- receiving, from the cooperative UE via a radio resource control (RRC) message, a shared uplink configuration comprising the cooperative UE uplink configuration based on the pointer.

3. The method of claim 1, wherein the target UE uplink configuration comprises the cooperative UE uplink configuration, wherein the cooperative UE uplink configuration indicates an uplink resource allocation for transmitting the scheduled uplink transmission at the cooperative UE.

4. The method of claim 1, wherein the cooperative UE uplink configuration comprises a physical uplink control channel (PUCCH) configuration of the cooperative UE, wherein the scheduled uplink transmission comprises uplink control information (UCI) based on the PUCCH configuration.

5. The method of claim 1, wherein the cooperative UE uplink configuration comprises a physical uplink shared channel (PUSCH) configuration of the cooperative UE, wherein the scheduled uplink transmission comprises uplink data based on the PUSCH configuration.

6. The method of claim 1, wherein the cooperative UE uplink configuration comprises a PUCCH configuration and a PUSCH configuration of the cooperative UE.

7. The method of claim 1, wherein the receiving the target UE uplink configuration comprises receiving, from the base station, the target UE uplink configuration and the cooperative UE uplink configuration.

8. The method of claim 1, further comprising receiving, from the base station, a downlink control signal indicating a selection between the target UE uplink configuration and the cooperative UE uplink configuration.

9. The method of claim 8, wherein the transmitting the information for transmitting the scheduled uplink transmission comprises transmitting, to the cooperative UE, at least a portion of the downlink control signal that includes downlink control information associated with the target UE when the downlink control signal indicates the selection of the cooperative UE uplink configuration.

10. A method of wireless communication at a base station (BS), comprising:
- transmitting, to a target user equipment (UE), a target UE uplink configuration indicating a cooperative UE uplink configuration associated with a cooperative UE;
- transmitting, to the target UE in a first frequency range, a downlink configuration, wherein the transmitting the target UE uplink configuration comprises transmitting the target UE uplink configuration in a second frequency range different than the first frequency range;
- transmitting, to a cooperative UE, the cooperative UE uplink configuration indicating an uplink resource allocation for transmitting a scheduled uplink transmission for the target UE; and
- receiving, from the cooperative UE, the scheduled uplink transmission.

11. The method of claim 10, wherein the target UE uplink configuration comprises a pointer to the cooperative UE uplink configuration and a duplicate copy of the cooperative UE uplink configuration.

12. The method of claim 10, wherein the transmitting the target UE uplink configuration comprises transmitting, to the target UE, the target UE uplink configuration and the cooperative UE uplink configuration.

13. The method of claim 12, further comprising transmitting, to the target UE, a downlink control signal indicating a selection between the target UE uplink configuration and the cooperative UE uplink configuration.

14. The method of claim 13, wherein the receiving the scheduled uplink transmission comprises receiving, from the cooperative UE, a physical uplink shared channel (PUSCH) transmission based on the downlink control signal indicating a selection of the cooperative UE uplink configuration.

15. A method of wireless communication at a cooperative user equipment (UE), comprising:
- receiving, from a base station in a second frequency range and prior to a scheduled uplink transmission, a cooperative UE uplink configuration indicating an uplink resource allocation for transmitting the scheduled uplink transmission for a target UE;
- receiving, from the base station in a first frequency range different than the second frequency range, a downlink configuration of the cooperative UE;
- receiving, from the target UE, information for transmitting the scheduled uplink transmission; and
- transmitting, to the base station, the scheduled uplink transmission for the target UE.

16. The method of claim 15, further comprising:

receiving, from the target UE, a pointer to the cooperative UE uplink configuration; and transmitting, to the target UE via a radio resource control (RRC) message, a shared uplink configuration comprising the cooperative UE uplink configuration based on the pointer.

17. The method of claim 15, wherein the cooperative UE uplink configuration comprises a physical uplink control channel (PUCCH) configuration of the cooperative UE, wherein the scheduled uplink transmission comprises uplink control information (UCI) based on the PUCCH configuration.

18. The method of claim 15, wherein the cooperative UE uplink configuration comprises a physical uplink shared channel (PUSCH) configuration of the cooperative UE, wherein the scheduled uplink transmission comprises uplink data based on the PUSCH configuration.

19. The method of claim 15, wherein the cooperative UE uplink configuration comprises a PUCCH configuration and a PUSCH configuration of the cooperative UE.

20. An apparatus for wireless communication at a target user equipment (UE), comprising:

at least one processor; a transceiver; and a memory coupled to the at least one processor and the transceiver, storing computer-executable code, which when executed by the at least one processor, causes the apparatus to:

receive, from a base station via the transceiver, a target UE uplink configuration for a scheduled uplink transmission;

determine that the target UE uplink configuration includes an indication that a cooperative UE is configured to transmit the scheduled uplink transmission for the target UE based on a cooperative UE uplink configuration of the cooperative UE;

receive, from the base station in a first frequency range, a downlink configuration, wherein receiving the target UE uplink configuration comprises receiving the target UE uplink configuration in a second frequency range different than the first frequency range; and transmit, to the cooperative UE via the transceiver, information for transmitting the scheduled uplink transmission.

21. The apparatus of claim 20, wherein the indication includes a pointer to the cooperative UE uplink configuration, and wherein the computer-executable code, which when executed by the at least one processor, further causes the apparatus to:

transmit, to the cooperative UE, the pointer; and receive, from the cooperative UE via a radio resource control (RRC) message, a shared uplink configuration comprising the cooperative UE uplink configuration based on the pointer.

22. The apparatus of claim 20, wherein the target UE uplink configuration comprises a physical uplink control channel (PUCCH) configuration of the cooperative UE, wherein the scheduled uplink transmission comprises uplink control information (UCI) based on the PUCCH configuration.

23. The apparatus of claim 20, wherein the cooperative UE uplink configuration comprises a PUCCH configuration of the cooperative UE, wherein the scheduled uplink transmission comprises uplink control information (UCI) based on the PUCCH configuration.

24. The apparatus of claim 20, wherein the cooperative UE uplink configuration comprises a physical uplink shared channel (PUSCH) configuration of the cooperative UE, wherein the scheduled uplink transmission comprises uplink data based on the PUSCH configuration.

25. The apparatus of claim 20, wherein the cooperative UE uplink configuration comprises a PUCCH configuration and a PUSCH configuration of the cooperative UE.

26. The apparatus of claim 20, wherein the computer-executable code, which when executed by the at least one processor, further causes the apparatus to receive, from the base station, the target UE uplink configuration and the cooperative UE uplink configuration.

27. The apparatus of claim 20, wherein the computer-executable code, which when executed by the at least one processor, further causes the apparatus to receive, from the base station, a downlink control signal indicating a selection between the target UE uplink configuration and the cooperative UE uplink configuration.

28. The apparatus of claim 27, wherein the computer-executable code, which when executed by the at least one processor, further causes the apparatus to transmit, to the cooperative UE, at least a portion of the downlink control signal that includes downlink control information associated with the target UE when the downlink control signal indicates the selection of the cooperative UE uplink configuration.

* * * * *